US009451026B2

United States Patent
Langas et al.

(10) Patent No.: US 9,451,026 B2
(45) Date of Patent: Sep. 20, 2016

(54) ELECTRONIC DEVICES

(71) Applicant: Millennium Enterprise Corporation, Fairfax, VA (US)

(72) Inventors: Thomas Langas, Trondheim (NO); Asbjom Djupdal, Trondheim (NO); Borgar Ljosland, Trondheim (NO); Torstein Hernes Dybdahl, Trondheim (NO)

(73) Assignee: Millennium Enterprise Corporation, Fairfax, VA (US)

( * ) Notice: Subject to any disclaimer, the term of this patent is extended or adjusted under 35 U.S.C. 154(b) by 0 days.

(21) Appl. No.: 14/724,652

(22) Filed: May 28, 2015

(65) Prior Publication Data

US 2015/0339243 A1 Nov. 26, 2015

Related U.S. Application Data

(63) Continuation of application No. 13/819,304, filed as application No. PCT/GB2011/001277 on Aug. 26, 2011, now Pat. No. 9,069,488.

(30) Foreign Application Priority Data

Aug. 27, 2010 (GB) .................................. 1014373.3
Apr. 28, 2011 (GB) .................................. 1107266.7

(51) Int. Cl.
*G06F 13/00* (2006.01)
*H04L 29/08* (2006.01)
(Continued)

(52) U.S. Cl.
CPC ......... *H04L 67/1097* (2013.01); *G06F 3/0605* (2013.01); *G06F 3/0643* (2013.01);
(Continued)

(58) Field of Classification Search
CPC .............................. G06F 13/10; G06F 13/385
See application file for complete search history.

(56) References Cited

U.S. PATENT DOCUMENTS 5,004,232 A 4/1991 Wong et al.
5,579,489 A 11/1996 Dornier et al.
(Continued)

FOREIGN PATENT DOCUMENTS

GB 2483239 3/2012
JP 20055124317 A 5/2005
(Continued)

OTHER PUBLICATIONS

The Raspberry Pi Foundation printout. May 8, 2011. One page, http://www.raspberrypi.org.
(Continued)

*Primary Examiner* — Zachary K Huson
(74) *Attorney, Agent, or Firm* — Lawrence Youst PLLC

(57) ABSTRACT

A storage device 3, such as an SD card, that is coupled to a host device 2, such as a mobile phone, includes a computing environment 8. The computing environment 8 includes an application processing part 6, and a separate interface processing part 7. The application processing part 6 of the computing environment 8 is operable to execute one or more applications on the storage device 3. The interface processing part 7 of the computing environment 8 includes an interface processor that interfaces between a communications protocol used between the host device 2 and the storage device 3, and a communications protocol used by the application processor in the application processing part 6 of the storage device 3. The interface processor communicates with the application processor via interrupts and a shared memory 9.

20 Claims, 10 Drawing Sheets

(51) Int. Cl.
*G06F 13/28* (2006.01)
*H04L 29/06* (2006.01)
*G06F 3/06* (2006.01)
*G06F 9/445* (2006.01)
*G06F 9/54* (2006.01)
*G06F 21/57* (2013.01)
*G06F 21/62* (2013.01)
*G06F 13/10* (2006.01)
*G06F 13/38* (2006.01)

(52) U.S. Cl.
CPC .......... *G06F 3/0664* (2013.01); *G06F 3/0667* (2013.01); *G06F 3/0671* (2013.01); *G06F 3/0679* (2013.01); *G06F 9/44573* (2013.01); *G06F 9/44584* (2013.01); *G06F 9/547* (2013.01); *G06F 13/102* (2013.01); *G06F 13/28* (2013.01); *G06F 21/575* (2013.01); *G06F 21/6218* (2013.01); *H04L 29/08549* (2013.01); *H04L 67/42* (2013.01); *G06F 13/10* (2013.01); *G06F 13/385* (2013.01)

(56) References Cited

U.S. PATENT DOCUMENTS

| | | | |
|---|---|---|---|
| 5,599,232 | A | 2/1997 | Darling |
| 5,603,056 | A | 2/1997 | Totani |
| 5,724,497 | A | 3/1998 | San et al. |
| 5,850,230 | A | 12/1998 | San et al. |
| 5,974,461 | A | 10/1999 | Goldman et al. |
| 6,003,065 | A | 12/1999 | Yan et al. |
| 6,006,319 | A | 12/1999 | Takahashi et al. |
| 6,190,257 | B1 | 2/2001 | Takeda et al. |
| 6,516,202 | B1 | 2/2003 | Hawkins et al. |
| 6,646,653 | B2 | 11/2003 | San et al. |
| 6,715,068 | B1 | 3/2004 | Abe |
| 6,718,415 | B1 | 4/2004 | Chu |
| 6,779,066 | B2 | 8/2004 | Sakamoto |
| 1,115,223 | A1 | 6/2005 | Yu et al. |
| 6,944,859 | B2 | 9/2005 | Bunger |
| 6,978,453 | B2 | 12/2005 | Rao et al. |
| 7,028,025 | B2 | 4/2006 | Collins |
| 7,065,651 | B2 | 6/2006 | Evans |
| 7,159,059 | B2 | 1/2007 | McNeil |
| 7,337,329 | B2 | 2/2008 | Evans |
| 7,350,235 | B2 | 3/2008 | Jordan |
| 7,418,344 | B2 | 8/2008 | Holtzman et al. |
| 7,461,177 | B2 | 12/2008 | Drabczuk |
| 7,512,743 | B2 | 3/2009 | Tom et al. |
| 7,558,907 | B2 | 7/2009 | Stern et al. |
| 7,835,857 | B2 | 11/2010 | Gretton |
| 7,966,355 | B2 | 6/2011 | Sherman et al. |
| 8,166,244 | B2 | 4/2012 | Fruchter et al. |
| 8,238,972 | B2 | 8/2012 | Wang et al. |
| 8,332,583 | B2 | 12/2012 | Blazevic et al. |
| 8,699,218 | B2 | 4/2014 | Xu |
| 8,793,518 | B2 | 7/2014 | Reddy |
| 8,966,108 | B2 | 2/2015 | Richter et al. |
| 9,069,488 | B2 | 6/2015 | Langas et al. |
| 9,134,923 | B2 | 9/2015 | Langas et al. |
| 2002/0138567 | A1 | 9/2002 | Ogawa |
| 2003/0028699 | A1 | 2/2003 | Holtzman et al. |
| 2003/0135742 | A1 | 7/2003 | Evans |
| 2004/0098596 | A1 | 5/2004 | Elteto et al. |
| 2004/0186949 | A1 | 9/2004 | Liu et al. |
| 2004/0215706 | A1 | 10/2004 | Lavender et al. |
| 2005/0091421 | A1 | 4/2005 | Odamura |
| 2005/0102312 | A1 | 5/2005 | Ohya et al. |
| 2005/0125619 | A1 | 6/2005 | Evans |
| 2006/0101176 | A1 | 5/2006 | Eric et al. |
| 2006/0101182 | A1 | 5/2006 | Drabczuk |
| 2006/0117171 | A1 | 6/2006 | Chen |
| 2006/0123175 | A1 | 6/2006 | Yu et al. |
| 2006/0192987 | A1 | 8/2006 | Wu et al. |
| 2007/0022148 | A1 | 1/2007 | Akers et al. |
| 2007/0039897 | A1 | 2/2007 | Drexler |
| 2007/0088904 | A1 | 4/2007 | Sinclair |
| 2007/0168648 | A1 | 7/2007 | Mardiks et al. |
| 2007/0288553 | A1 | 12/2007 | Donaghey et al. |
| 2008/0005733 | A1 | 1/2008 | Ramachandran et al. |
| 2008/0010290 | A1 | 1/2008 | Lecrone et al. |
| 2008/0016176 | A1 | 1/2008 | Leitner |
| 2008/0091878 | A1* | 4/2008 | Stern ............... G06F 3/061 711/115 |
| 2008/0172665 | A1 | 7/2008 | McIlroy |
| 2008/0195797 | A1 | 8/2008 | Sherman et al. |
| 2008/0201714 | A1 | 8/2008 | Nagashima |
| 2008/0243466 | A1 | 10/2008 | Brunet et al. |
| 2008/0288700 | A1 | 11/2008 | Holtzman et al. |
| 2008/0295167 | A1 | 11/2008 | Holtzman et al. |
| 2008/0307142 | A1 | 12/2008 | Sherman et al. |
| 2009/0150703 | A1 | 6/2009 | Rave et al. |
| 2009/0235013 | A1 | 9/2009 | Seo |
| 2009/0276524 | A1 | 11/2009 | Ahtani |
| 2010/0115177 | A1 | 5/2010 | Bryant-Rich et al. |
| 2010/0146279 | A1 | 6/2010 | Lu et al. |
| 2010/0194667 | A1 | 8/2010 | Lee et al. |
| 2010/0197289 | A1 | 8/2010 | Lee et al. |
| 2010/0197347 | A1 | 8/2010 | Lee |
| 2010/0198994 | A1 | 8/2010 | Lee |
| 2010/0199008 | A1 | 8/2010 | Lee et al. |
| 2010/0229004 | A1 | 9/2010 | Asnaashari |
| 2010/0250834 | A1 | 9/2010 | Trika et al. |
| 2011/0111802 | A1 | 5/2011 | Richter et al. |
| 2011/0249391 | A1 | 10/2011 | Xu |
| 2011/0252209 | A1 | 10/2011 | Lee |
| 2012/0023146 | A1 | 1/2012 | Shoji et al. |

FOREIGN PATENT DOCUMENTS

| | | |
|---|---|---|
| WO | WO 99/04342 | 1/1999 |
| WO | WO 01192973 A3 | 12/2001 |
| WO | WO 031100610 A1 | 12/2003 |
| WO | WO 2004/008313 A1 | 1/2004 |
| WO | WO2004/038546 A2 | 5/2004 |
| WO | WO 2004/068319 A2 | 8/2004 |
| WO | WO 2007/049850 A1 | 5/2007 |
| WO | WO 2008/058154 A2 | 5/2008 |
| WO | WO 2009/090070 A3 | 7/2009 |
| WO | 2012028875 A1 | 3/2012 |
| WO | 2013008058 A1 | 1/2013 |
| WO | WO 2013008058 | 1/2013 |

OTHER PUBLICATIONS

International Preliminary Report on Patentability PCT/GB2011/001277 (Form PCT/IB/373) dated Mar. 5, 2013, and Written Opinion of the International Searching Authority (Form PCT/ISN237).

United Kingdom Intellectual Property Office, Search Report Under Section 17(5), for Application No. GB1107266.7 dated Sep. 5, 2011.

United Kingdom Intellectual Property Office, Examination Report Under Section 18(3), for Application No. GB1114895.4 dated Nov. 29, 2012.

United Kingdom Intellectual Property Office, Combined Search and Examination Report under Sections 17 and 18(3), for Application No. GB1114895.4 dated Oct. 4, 2011.

United Kingdom Intellectual Property Office, Search Report Under Section 17(5), for Application No. GB1014373.3 dated Jun. 28, 2011.

United Kingdom Intellectual Property Office, Combined Search and Examination Report under Sections 17 and 18(3), for Application No. GB1114893.9 dated Dec. 22, 2011.

Seongjun Ahn, et al.; "Design Implementation and Performance Evaluation of Flash memory-based File System on Chip"; Journal of Information Science and Engineering 23, pp. 1865-1887 (2007).

Masao Uebayashi, "Execute-In-Place (X1P) Support for NetBSD", Tombi Inc. uebayasi@tornbi.co.jp, Apr. 5, 2010, pp. 1-15.

"Subject Matter Search Report", Freedom to Operate Search related to PCT/GB20111001277 and PCT/GB2011/001278, dated Jun. 27, 2011.

(56) References Cited

OTHER PUBLICATIONS

Tony Benavides, et al; "The Implementation of a Hybrid-Execute-in-Place Architecture to Reduce the Embedded System memory Footprint and Minimize Boot Time", Flash Memory Group, Intel Corporation; California State University, Sacramento; IEEE 2007 pp. 473-479.
International Search Report for PCT/GB2011/001277 dated Oct. 25, 2011.
Backing Storage for the File-backed Storage Gadget; Jun. 14, 2005.
Droid X by Motorola User Guide; 2011; Motorola Mobility, Inc.; pp. 1-63.
International Preliminary Report on Patentability for PCT/GB2011/001278; Mar. 5, 2013.
International Preliminary Report on Patentability for PCT/GB2012/052840; May 20, 2014.
The How-To Geek; Gmote Turns Your Android Phone Into a Remote Control for Your PC; Jul. 20, 2010; Lifehacker; pp. 1-2.

* cited by examiner block address space

M-S file stream packet

S-M file stream packet

ELECTRONIC DEVICES

This application is a continuation of and claims the benefit of U.S. patent application Ser. No. 13/819,304, filed on Jun. 11, 2013.

The present invention relates to electronic devices and in particular to electronic devices that can interface with and use storage devices.

Many electronic devices, such as mobile phones, cameras, etc., use storage devices, such as removable memory cards, to provide additional storage capacity for example for storing content such as photographs, music or video, generated by or to be used by the device. In such arrangements, the storage device acts as a "slave" to the "master" electronic device that is accessing and using the storage on the storage device.

While the use of storage devices, such as memory cards for providing supplemental storage for electronic devices is well-established, the Applicants believe that there is further scope for exploiting the ability to use storage devices with electronic devices.

The Applicants have developed a system for allowing applications to be run on a storage device, such as an SD card, that is coupled to a host device, such as a mobile phone. In this system, the storage device includes, inter alia, a computing environment that executes both the application in question and that can interact with the host device to allow a user of the host device to interact with and use the application running on the storage device.

In these arrangements, the computing environment on the storage device accordingly performs appropriate application operations, such as taking user inputs from the host device, and producing appropriate outputs for the host device, such as video frames (a frame buffer) and audio streams. Thus data and commands, etc., must be communicated in an appropriate form or forms from the application processor on the storage device to the host device and vice-versa.

The Applicants have recognised that there could be situations where the form of data and commands that will be used for communication between the host device and the storage device may not be the same as the form of data and commands that will be required by the application running on the storage device, and vice-versa. This issue may be exacerbated by the fact that there are many different application processors and operating systems in existence and that could be used as the application processor in the system.

Thus, there may be a need for the communication (e.g. data and commands) between the host device and storage device to be, in effect, converted or "translated" for communication appropriately to the application that is being executed, and vice-versa. While this could be done in a number of different ways, and carried out in any suitable and desired manner, the Applicants believe that there is scope for advantageous arrangements for this process.

The Applicants accordingly believe that there remains scope for further improvements to systems of the type described in their earlier UK patent application.

According to a first aspect of the present invention, there is provided a system comprising:
a host electronic device; and
a storage device that is coupled to the host electronic device via an interface between the host electronic device and the storage device; wherein:
the storage device comprises a computing environment operable to execute one or more applications on the storage device; and
the storage device and the electronic device are configured to allow an application running on the storage device to use input and output functions of the host electronic device; and wherein:
the computing environment on the storage device comprises an application processing part comprising at least one application processor for executing the application on the storage device, and an interface processing part comprising at least one interface processor that is separate to the application processor, for interfacing between the application processor and the host device, the computing environment being configured such that communication between the host device and an application that is being executed on the application processor takes place via the interface processor.

According to a second aspect of the present invention, there is provided a method of operating a system comprising an electronic device and a storage device that is coupled to the electronic device, the method comprising:
executing an application in a computing environment on the storage device;
allowing the application to use input and output functions of the electronic device; and
using an application processing part of the computing environment on the storage device comprising at least one application processor for executing the application on the storage device;
and using an interface processing part of the computing environment on the storage device comprising at least one interface processor that is separate to the application processor for interfacing between the application processor and the host device, such that communication between the host device and an application that is being executed on the application processor takes place via the interface processor.

The present invention relates to an arrangement in which an application for use on a host device can be executed in a computing environment of a storage device that is coupled to the host device. However, in the present invention, the computing environment includes both an application processor for executing the application itself, and a separate interface processor for interfacing between the application processor and the host device.

In other words, rather than carrying out any necessary communications interfacing and translation on the application processor itself (e.g. by means of suitable software running on the application processor) or on the host device (e.g. by means of suitable software running on the host device), the present invention provides and uses a separate processor on the storage device for this purpose. As will be discussed further below, the Applicants have found that this can provide a number of advantages.

For example, by carrying out the communication interfacing and translation on a separate interface processor on the storage device, the burden of that processing is removed from the application processor on the storage device. This can then, e.g., allow the application processor to run on the storage device with substantially the same performance as it would have in any other environment, and avoids the need to make significant changes to the application processor for it to be suitable for use in systems in accordance with the present invention. Similarly, it avoids the need to make any hardware or software changes for this purpose on the host device.

Using a separate interface processor in this manner also, e.g., enhances the flexibility and scaleability of the system. For example, using a separate interface processor can avoid restrictions on the type of application processors that may be used in the system (e.g. can support multiple different application processor operating systems), and can allow the use of plural application processors in a given system with a shared interface processor. Using a separate interface processor also means that the interface processor can more straightforwardly be retro-fitted to an existing system.

Using a separate interface processor can also be advantageous in terms of security, boot times, etc. (as will be discussed further below).

The present invention also extends to the storage device on its own. (Since, for example, any suitably equipped electronic device will be able to interact with a suitably equipped storage device, and vice-versa.)

Thus, according to a third aspect of the present invention, there is provided a storage device, comprising:

a memory for storing content for or generated by a host device to which the storage device is coupled;

a device-host interface for allowing a host device that the storage device is coupled to read data from and write data to the storage device; and a computing environment operable to execute one or more applications on the storage device; wherein:

the storage device is configured to be operable to interact with a host device to allow an application running on the storage device to use input and output functions of the host device via the device-host interface; and wherein:

the computing environment on the storage device comprises an application processing part comprising at least one application processor for executing the application on the storage device, and an interface processing part comprising at least one interface processor that is separate to the application processor for interfacing between the application processor and the host device, the computing environment being configured such that communication between the host device and an application that is being executed on the application processor takes place via the interface processor.

The host electronic device may be any suitable such device that can be coupled to and interface with the storage device. It could, for example, be an appliance such as a television, printer, washing machine, cooker, etc., or a personal computer. In a preferred embodiment it is a portable device. Preferably it is one of a phone, a camera, a portable entertainment device (e.g. music and/or video player and/or a gaming device), a personal navigation system, and an in-car navigation and/or entertainment system.

The storage device can be any suitable such device, namely a device that can provide storage for a coupled host electronic device and which supports a protocol between the storage device and the host electronic device for the purpose of storing data on (and reading data from) the storage device in which there is a master/slave interface between the host device (the master) and the storage device (the slave). It may, for example, and preferably does, comprise any suitable portable storage device, such as a portable hard drive, but it could also be a non-portable storage device that has a master/slave interface, such as a non-portable hard drive with a computer on board that communicate via a SATA (Serial Advanced Technology Attachment) interface.

In a preferred embodiment the storage device is a non-volatile (flash) memory device, such as, and preferably, a removable memory card. In a particularly preferred embodiment, the storage device is one of an SD card (including a micro-SD card), a compact flash card, and a USB memory stick.

The interface between the host device and the storage device can be any suitable such interface. As is known in the art, it will typically be a suitable wired interface (where, e.g., the storage device is used by plugging it into a suitable port on the host device). However, the interface could also be wireless, where, for example, the storage device and host device are coupled via a short-range RF, IR, WLAN or other wireless link.

The system (the storage device and host device) can be configured to allow an application that is being executed on the storage device to access and use the input and output functions on the host electronic device to which the storage device is coupled in any suitable and desired manner.

In a preferred embodiment, in order to facilitate this, the storage device and the host electronic device are provided with a server module and a corresponding client module, respectively. The server module on the storage device preferably allows the storage device to act as a master, controlling input and output functions of the host device via the client module on the host device. The client module on the host device is preferably operable to interface with the master storage device and to use the input and output functions on the host device on behalf of the "master" storage device. In this way, respective server and client modules can allow an application that is running on the storage device to use input and output functions of the host electronic device.

Thus, in a particularly preferred embodiment, the storage device comprises a server module and the electronic device comprises a client module operable to interact with each other so as to allow an application running on the storage device to use input and output functions of the host electronic device. Similarly, the method of the present invention preferably includes using a server module on the storage device and a client module on the electronic device to allow the application to use input and output functions of the electronic device.

It should be noted here that the arrangement of the present invention is such that an application is executed in a computing environment on the storage device, and the storage device then acts as a "master", controlling slave functions on the host electronic device (which is therefore a "slave" to the "master" storage device). This should be contrasted with, for example, the situation where a storage device may store application code for a given application, but the application is then executed on the host electronic device.

The client module on the host electronic device and the server module on the storage device can be provided and configured in any appropriate fashion. They are preferably provided by means of appropriate client and server, respectively, software that is running on the respective devices.

The server module on the storage device may, e.g., be run on the application processor or on the interface processor, or distributed across both the application processor and the interface processor. In a particularly preferred embodiment it is run on the interface processor (i.e. the interface processing part performs the server functions on the storage device). This, inter alia, avoids burdening the application processor with the need to run the server module.

The application that is to be executed on the storage device can be any suitable and desired application. Preferably, there are a plurality of applications that can be executed on the storage device. Exemplary applications include games, productivity applications such as spreadsheets and word processors, internet browsers, email clients, video, photo and audio editing tools, internet applications, user interface applications, etc.

The code (and content) for the applications that are to be executed on the storage device should be stored in memory on the storage device that is accessible to the computing environment on the storage device. The application(s) may, for example, be stored in the "normal" memory (mass storage) that the storage device provides to the host device, or there may, e.g., be a separate memory that is provided for this purpose.

The input and output functions of the host device that can be used by an application that is running on the storage device can include any suitable such functions. Thus they may, and preferably do, include, input functions such as a key pad, touch screen and/or audio input, and outputs such as a screen and/or audio output. Preferably all of the available input and output functions of the host device can be used by an application that is running on the storage device.

In a particularly preferred embodiment, an application running on the storage device can interact with and make use of other functions of the host electronic device. In a preferred such arrangement, an application running on the storage device can use the network connections of the host device in order for applications running on the storage device to access the Internet. Other functions of a host device that it may be particularly desirable to use are resources that generate and/or collect data that may be useful to an application, such as GPS functions, sensor functions, a microphone, a camera, and a video decoder/encoder, etc., of the host device.

The computing environment on the storage device can comprise any suitable and desired such environment. As discussed above, it should comprise at least an application processor (a processor for executing an application on the storage device) and a separate interface processor (a processor for handling data and instruction communication between the host device and the application processor).

The processors on the storage device should also have access to memory on the storage device (to allow them to run the application or applications, etc.). This may be the same memory as would be used by a host electronic device when it uses the storage device for storage in the normal fashion, or there may also or instead be (further) memory that is provided specifically for the use of computing environment processors on the storage device. In a preferred embodiment, as well as the, e.g., normal non-volatile memory on the storage device, the computing environment includes a random access memory (RAM) that is useable by the processors of the computing environment.

The application processing part of the computing environment on the storage device can comprise any suitable and desired components and elements. It should comprise at least a micro-processor that is capable of executing the application or applications in question, running the server (if required), etc. In a preferred embodiment, the storage device has a general-purpose CPU for this purpose, but it may also or instead have a more dedicated processor, such as a graphics processor.

The application processor may be any suitable such processor. As discussed above, an advantage of the present invention is that it can allow operation with any form of application processor and application processor operating system. In one preferred embodiment there is a single application processor on the storage device (in the application processing part of the computing environment on the storage device).

However, it would be possible for there to be plural application processors (which need not all be the same). Thus, in another preferred embodiment, the application processing part of the computing environment on the storage device includes plural application processors. In this case, the plural application processors preferably share, and communicate with the host device via, the same, single, interface processor. Where plural application processors are provided, there is at least a CPU (or some other form of more general processor) and a graphics processor (GPU).

In a particularly preferred embodiment, the application processing part comprises at least one CPU (or some other form of more general processor), and one or more of, and preferably all of, a graphics processor (GPU), debugging infrastructure, peripherals, power management, and clock control.

The interface processing part of the computing environment can similarly be configured in any suitable and desired manner, and take any suitable and desired form. It should at least comprise, as discussed above, a processor (which may be a CPU, dedicated hardware, etc., as desired) operable to interface (translate) between a communications protocol used between the host device and the storage device, and a communications protocol required or expected by an application being executed on the application processor. It should also have appropriate communications interfaces to the host device and to the application processing part of the computing environment on the storage device.

As discussed above, it is believed that the provision of such an interface processing element is particularly advantageous, as it, for example, can readily enable an existing application processor design to be used in the manner described herein (and can, e.g., be retro-fitted to existing systems for that purpose). The present invention accordingly extends to the interface processing part itself.

Thus, according to a further aspect of the present invention, there is provided an interface processing module for use on a storage device that can be coupled to a host electronic device via an interface between the host electronic device and the storage device, and which storage device comprises a computing environment operable to execute one or more applications on the storage device, the interface processing module comprising:

at least one interface processor that is operable to interface between a communications protocol used between the host device and the storage device, and a communications protocol required or expected by an application being executed on the application processor; and communications interfaces for coupling the interface module to the host device and to an application processing part of the computing environment on the storage device, such that communication between the host device and an application that is being executed on the application processor can take place via the interface processor.

As will be appreciated by those skilled in the art, these aspects of the present invention can, and preferably do, include any one or more or all of the preferred and optional features of the present invention described herein, as appropriate.

The interface (translation) function of the interface processor should be operable to take data received from the host device and convert it to the appropriate data structures that the application processor(s) uses, and vice-versa.

In a preferred embodiment, the interface processor, as well as being able to convert data between the protocol required for communication with the host device, and the protocol required by application processing element, is also able to encode and/or compress data to be sent to the host device. It can preferably also or instead, and preferably also, encode and/or compress data sent from the host device. This will then reduce the data transfer requirements for sending data to the host device (and/or for sending data received from the host device), and accordingly reduce power usage, for example.

The communications interface of the interface processing part between the interface processing part and the host device can take any suitable and desired form, e.g., depending upon the storage device and host device in question. It is preferably the normal interface that the host device would have with the storage device. Thus, in a preferred embodiment, the interface processing part includes a mass storage communications interface (an interface that supports mass storage access from a host device) such as, and preferably, an SD or USB interface, for communicating with the host device.

In this arrangement, the interface processor accordingly preferably translates between the application processor and the data protocol used between the storage device and the host device.

The communications interface between the interface processing part and the application processing part of the computing environment on the storage device could, e.g., comprise a direct interface (connections) between the interface processing part and the application processing part. However, in a particularly preferred embodiment, at least in the case of data communication, communication between the interface processing part and the application processing part takes place via shared memory, as opposed to any form of direct connection. This is advantageous from a hardware perspective and may also, e.g., facilitate enhanced security.

Enhanced security arrangements facilitated by this could comprise, for example (and in preferred embodiments do comprise), making application code running on the application processing part not accessible to the interface processing part; in the case of graphics applications sharing only the frame buffer from (generated by) the application processing part with the interface processing part (and keeping all application code and application data inside memory areas only accessible by the application processing part); and/or limiting the interface processing part (e.g. by hardware features and/or by software features) to only have access to the shared memory (with all other system memory only being accessible by the application processing part). Preferably, the application processing part processor (e.g. CPU) has full control of what data leaves the storage device, and the interface processing part is limited (by hardware or software) to only have access to the shared memory region, and not to any of the application data or dynamic data used by the application processing part.

Thus, in a particularly preferred embodiment, there is no direct data communications connection between the interface processing part and the application processing part, and the interface processing part includes appropriate elements and functionality for communicating with the application processing part via shared memory (and the application processing part correspondingly includes appropriate elements and functionality for communicating with the interface processing part via shared memory). Thus, the interface processing part preferably accesses data structures stored by the application processing part in a shared memory to receive communications from the application processing part and vice-versa.

Thus, in a particularly preferred embodiment, the interface processing part is operable to fetch data structures that have been written to shared memory by the application processing part, and to process those data structures into a form suitable for transfer to the host device. Similarly, the interface processing part is preferably operable to process data structures received from the host device into a form suitable for transfer to the application processor and to write those data structures to shared memory for use by the application processing part.

Thus, in a particularly preferred embodiment, the computing environment on the storage device also includes memory (shared system memory) that is to be and that is shared by the application processing part and the interface processing part, and that is used by the application processing part and the interface processing part to communicate with each other.

As well as communicating via a shared memory (or otherwise), in a particularly preferred embodiment, an interrupt mechanism is provided between the application processing part and the interface processing part of the computing environment on the storage device, to facilitate (trigger) communication between the application processor and the interface processor and vice-versa. This interrupt mechanism may then be used, e.g., to cause the application processor to respond to inputs from the host device (the client side) that have been processed by the interface processor (and, e.g., placed in the shared memory).

The interface processing part accordingly preferably includes an interrupt controller, which interrupt controller is preferably coupled to all the interrupt sources of the application processing parts, and/or all the internal interrupt sources of the interface processing part.

Interrupts from the application processing part to the interface processing part can be carried out in any suitable and desired manner. In one preferred embodiment all the application processor interrupts are available on the interface processing part interrupt controller.

In another preferred embodiment, the application processor interrupts are also or instead handled by the application processor interrupt controller, with interrupts needed for the interface processing part being raised by writing to an interface processing part register.

It would also or instead be possible, e.g., to have an extra interrupt controller in the application processing part that groups all interrupts to the interface processing part, and makes all application processing part interrupts available to the interface processing part.

The interface processing part corresponding preferably has the ability to interrupt the application processing part via an interrupt signal exiting from the interface processing part.

Other arrangements would, of course, be possible. For example, there could be only a single interrupt line from the application processing part to the interface processing part and vice-versa.

It would also be possible to operate the system without having dedicated interrupts between the application processing part and the interface processing part, if desired, and to use other communications mechanisms between the application processing part and the interface processing part of the computing environment. For example, the application processing part and the interface processing part could be configured to poll or otherwise periodically check a specific part of the shared memory for information about new data (communications) to be delivered to or retrieved from the shared memory.

Where the interface processing part includes separate controller components (such as an SD controller, a flash controller, etc.) inside the interface processing part, then the application processing part can preferably access these components over a shared bus. Access from the application processing part to these components is preferably controlled by the interface processing part.

In a particularly preferred embodiment, the interface processing part is operable to control, and controls, access to and from the mass storage, e.g. non-volatile mass storage, of the storage device. In other words, the interface processing part preferably operates to provide the "normal" mass storage functionality of the storage device to the host device.

This can be achieved in any suitable and desired fashion. For example, the interface processing part may, and preferably does, include a suitable mass storage (non-volatile memory) controller, such as a NAND or NOR flash device controller, or other controller that performs lower level access to a non-volatile storage device. It may also or instead include (execute) a suitable mass storage device driver, such as an SD-card controller driver.

Having the mass storage operation functionality on the interface processing part is advantageous because it avoids the need to provide this separately or via the application processing part. It also means that, as will be discussed further below, where the system is to be operated in "storage device" (e.g. memory card) only mode, there is no need to use the application processing part (or, indeed, even to boot the application processor(s)), thereby saving on power, and potentially allowing faster boot times, for example, for mass storage device operation. Thus, in a particularly preferred embodiment the interface processing part is able to provide the mass storage functionality without the application processing part.

In a particularly preferred embodiment, the interface processing part controls access to and from data storage (whether the mass storage or otherwise) on the storage device. Most preferably, all access to at least the mass storage on the storage device is controlled by the interface processing part (and preferably in respect of accesses by both the host device and by the application processing part to that storage).

This has the effect that all access to the mass storage, for example, on the storage device requires permission of the interface processing part, such that the interface processing part accordingly can act as a firewall between the host device and the mass storage on the storage device, and/or between the application processing part and the mass storage on the storage device. This can enhance the security of the system, for example by preventing malicious code from being transferred from a host device to the application processing part and vice-versa.

Thus, in a particularly preferred embodiment, the interface processing part controls access by the application processing part to areas of the mass storage (flash memory) on the storage device, and/or (and preferably also) controls access by the host device to areas of the mass storage (flash memory) on the storage device.

The ability to provide such security features is a further advantage of using an interface processing part that is separate to an application processing part in the computing environment on the storage device.

In a preferred embodiment, the interface processing part is operable to (and preferably does) scan any incoming and outgoing data, thereby to add a layer of security to the operation (by means of the data scanning). This scanning could be used, e.g., to try to identify, and then block, any unwanted, forbidden and/or restricted, etc., data entering or leaving the storage device. Unwanted data could comprise, for example, attempts to inject malicious code into the storage device system. Forbidden or restricted data could comprise, e.g., copyrighted data that should be prevented from leaving the storage device.

As will be appreciated by those skilled in the art, in order to be able to operate in the full manner of the present invention, it will be necessary to enable (boot) both the application processor(s) and the interface processor(s) appropriately.

While it would be possible to always enable (boot) both elements together (e.g. at power up), in a particularly preferred embodiment, the interface processor can be enabled (booted) independently of the application processor(s). Most preferably the interface processor is operable without the application processor(s) being enabled (booted). This then has the advantage that where the application processor(s) is not needed, e.g., because the host device simply requires mass storage operation and the interface processor alone is needed for (supports) that, then the application processor does not need to be enabled, thereby saving power, etc.

Thus, in a particularly preferred embodiment, if the host device only wishes to access the mass storage functionality of the storage device, only the interface processor is enabled (booted).

This also means that the storage device can still be used as a normal storage device with host devices that are not enabled to use applications on the application processor of the storage device.

In a particularly preferred embodiment, the system is configured so as to only enable (boot) the interface processor on the storage device at power up. This helps to ensure lower power usage. This is preferably further helped by only running a minimum of components at power up. Preferably the interface processor runs at a lower clock frequency until it receives a request for more performance, at which point it may then increase the clock frequency, control the power controller, etc., to provide increased performance. Thus, in a preferred embodiment, the interface processor can vary the clock frequency at which it is operating. Requests for more performance could, e.g., be initialised from the host device running a (software) client requesting more functionality, and/or automatically by the interface processing part based on the host device's ability to provide power to the storage device, or other criteria.

The interface processor may be booted as desired. For example, and preferably, it may have a boot ROM and boot from that boot ROM. In a preferred embodiment, once it has started to boot, the interface processor preferably then continues to boot using data and code stored in the mass storage memory of the storage device, and/or using data and code stored on the host device and/or from over the Internet (e.g. where the relevant data is not yet stored in the memory on the storage device). This helps to allow the boot ROM for the interface processor to be as small as possible.

In a particularly preferred embodiment, the boot procedure for the interface processor carries out a number of authentication (security) checks as part of its process, and either continues with or aborts the boot procedure depending upon the outcome of those authentication checks.

For example, once the boot code on the boot ROM has been executed, the interface processor preferably then checks the authenticity of any further boot data and code stored in the mass storage memory of the storage device, and then proceeds (or not) to boot using that data and code stored in the mass storage memory of the storage device depending upon the result of the authentication check.

The authentication check could be carried out in any suitable and desired manner, for example by comparing an authentication key (or a value derived from an authentication key (such as a hash)) that is stored in secure storage accessible only to the interface processor with a corresponding key stored with the boot data and code in the mass storage memory of the storage device (or with a corresponding value, such as a hash, derived from a key stored with the boot data and code in the mass storage memory of the storage device).

Preferably, there is a further authentication check as the boot procedure continues using the data and code stored in the mass storage memory of the storage device, for example at an appropriate next boot code level. Again, this authentication check preferably comprises an appropriate comparison of an authentication key (or value derived from that key) stored with the boot data and code in the mass storage memory of the storage device with an authentication key (or value derived from an authentication key) stored in secure storage accessible to the interface processor, and again the boot procedure is preferably either continued or is aborted depending upon the result of that authentication check.

Accordingly, the interface processing part of the computing environment preferably includes some secure storage for storing the authentication key(s) (or values derivable from authentication key(s)) to be used to secure the boot procedure.

In a preferred embodiment, it is also possible to boot the system using boot code and data (a boot image) that is stored on an external storage device. This may be used, for example, to, in effect, boot the interface processor from a rescue image stored on an external storage device and/or as a procedure for loading the necessary boot code and data into the mass storage memory of the storage device for use for booting the interface processor when the system is started for the first time (i.e. for booting an empty system).

In this case, again the procedure is preferably that the interface processor is first booted from the boot ROM, and then, once it has started to boot, the interface processor preferably checks the authenticity of the stored boot image on the external storage device (which authentication procedure may again be, and is preferably, carried out by comparing appropriate authentication keys or key values).

In this case, if the authentication check is passed, the interface processor preferably then executes the boot code and data stored on the external storage device to continue booting the interface processor (e.g., and preferably, in the manner discussed above). It could, e.g., execute the boot code and data directly from the external storage device, or it could, e.g., load the boot code and data from the external storage device to the mass storage memory of the storage device, and then execute that boot data and code from the mass storage memory of the storage device to continue booting the interface processor (e.g., and preferably, in the manner discussed above).

In these arrangements, the interface processor will accordingly be enabled on its own. The application processor is preferably then enabled (booted) at a later time, preferably in response to (and preferably only in response to) some event that indicates a need for the application processor. The triggering event may, e.g., be, and preferably is, an appropriate user input on the host device, such as the activation of a client application on the host device. In response to this, the system will then start to boot the application processor on the storage device. The application processor is preferably booted by means of the interface processor giving the relevant mass storage boot address to the application processor.

Thus, in a particularly preferred embodiment, the computing environment on the storage device is enabled (booted) in two stages, firstly (at power up) to a mass storage operation mode by booting the interface processor only, and, if required, then, in a second, subsequent stage, to a full application processing mode by booting the application processor(s).

In a preferred embodiment, the storage device is configured such that it will only enable (boot) the application processor if the coupled host device can provide the necessary power, performance, etc. to support such operation. (This could be determined, e.g., by data communication using the low level SD or USB protocols (the SD and USB protocols, as is known in the art, exchange information about the power available from the host device and also the requirements from the storage device).)

The interface processor is preferably also configured to handle any necessary initialisation and handshaking with the host device.

It can be seen from the above, that in a preferred embodiment the interface processing part of the computing environment on the storage device is connected to a shared memory device and to a shared bus infrastructure, so that the application processing part can access internal components and/or functions of the interface processing part, and the interface processing part can access components/peripherals and/or functions of the application processing part. Most preferably the interface processing part of the computing environment on the storage device is capable of one or more, and preferably all of, the following functions: transfer of data between outside host and application processor; memory card mode handling; initialization of the application processor; initialization and handshaking with the host device; and providing the nonvolatile storage device functions to the host device.

Similarly, in a particularly preferred embodiment, the interface processing part in the computing environment on the storage device can and preferably does include one or more and preferably all of the following devices: a CPU or other controller able to control the components of the interface processing part; an external interface controller to the host device (this can be, for example, SecureDigital, USB or other interface supporting mass storage access from a host device); a non-volatile memory controller (this can, e.g., be a NAND flash device controller, NOR flash controller or other controller that performs lower level access to a non-volatile storage device); some internal system memory (for use as working space memory); a debugging infrastructure (such as jtag, uart etc.); a component for compression and encoding of video, audio or data; a boot ROM for booting of the system and storing application code; an interrupt controller with connection to some or all of the application processor interrupt sources and internal interrupt sources; and some secure storage (e.g. for storing authentication keys for securing the boot procedure, as discussed above).

As discussed above, a key advantage of the present invention is that it facilitates the use of application processors for executing applications on a storage device coupled to a host device without the need for significant changes or modifications to the application processor itself (and, indeed, in preferred embodiments at least, requires minimal, if any, changes or additions to the application processor(s)). However, the present invention does not preclude there being any changes or additions to the application processor, for example where that may be advantageous or required to allow the system to operate. Thus, for example, where appropriate, it is preferred to provide and execute a driver for the interface processor on the application processor(s), to allow the application processor to drive the interface processor (and the present invention encompasses such arrangements).

As will be appreciated by those skilled in the art, the communication between the storage device and the host device in the present invention could comprise, e.g., the sending of commands, content and/or other data to the host device (e.g. to the client module on the host device) and vice-versa. For example, data to be sent from the host device to the storage device may comprise, e.g., all data relating to key presses, network traffic, audio, video, gps, sensor inputs, etc.

The actual data that is communicated will depend on the application that is running on the storage device. For example, in the case of an, e.g., mapping application, key presses, internet traffic (streaming maps) and gps co-ordinates could be sent to the application on the storage device, which would then process the data and provide image data back to the client host device.

Similarly, data to be sent from the storage device to the host device preferably comprises at least image data (for display) but could also comprise audio data for example. In other applications it could comprise GPS data (where the storage device incorporates a GPS function) or network data (where the storage device incorporates a network function), for example.

As discussed above, in a particularly preferred embodiment, the existing storage device interface and communication protocol (i.e. that is provided for normal use of the storage device) is used for communication between the storage device and the host device (e.g. for communication between the server on the storage device and the client on the host device).

Thus, in a particularly preferred embodiment, the necessary communication between an application running on the storage device and the host device (e.g. between the server and client modules on the storage device and the host device, respectively) takes place via a data file input/output (read/write) mechanism that is provided for the transfer of data to and from the memory on the storage device (for its normal "mass storage" function). Thus, communication between the "master" storage device and the "slave" host device for the purpose of the present invention preferably takes place as appropriate (read/write) file accesses (data transfers) by the host device to the storage device, i.e. by means of the host device (the client on the host device) reading and writing files from and to the storage device using the conventional storage device interface and protocol.

This has the advantage that as such data transfer mechanisms will already be provided in any host and storage device system (for the purpose of storing data on and reading data from the storage provided on the storage device), the need to provide further communication arrangements and interfaces to provide the server and client operation for the present invention is avoided.

It also has the advantage that the normal "storage device" interface between the host and the storage device can straightforwardly be maintained, such that, for example, the host device will continue simply to assume and act as if there is storage device attached to it, and means that the present invention can be used with existing storage device systems.

In a particularly preferred embodiment, the communication from the master storage device to the slave host device is achieved by the slave host device reading files (data) from the storage device, and communication from the slave host device to the master storage device is achieved by the slave host device writing files (data) to the storage device.

The files (data) that are read and written may comprise commands, content or other data for the server or client module, as appropriate. They are preferably seen as generic data transfers by the host device, with the server or client module then interpreting the data transfers as being commands, content or other data, as appropriate and as necessary.

In a particularly preferred embodiment, certain data addresses (e.g. block addresses) are associated with "normal" data transfers (such that reads and writes to those addresses result in normal storage device behaviour), and other addresses are associated with (set aside for) the respective master and slave operation communications when an application is being executed on the storage device. Then by causing the host device to write data to and read data from the appropriate addresses, communication between an application running on the storage device and the relevant slave functions on the host device can be facilitated.

Thus, in a particularly preferred embodiment, communication from the host device to or for an application that is running on the storage device is achieved by the host device writing data to a memory address or addresses that has been set aside for (associated with) such communication, such that when the, e.g., server module on the, storage device sees that data is being written to that address, it can identify that data as being a communication that needs to be processed for or provided to the application in question. (The data that is written to the address may comprise, as discussed above, e.g. commands, content or other data for the server and/or application(s).)

Similarly, in a particularly preferred embodiment, communication from an application that is running on the storage device to the, e.g. client module of the, host device is achieved by host device reading (e.g. by the client module causing the host device to read) from a memory address or addresses that has been set aside for (associated with) such data transfers, such that when the, e.g. server module on the, storage device sees the host device attempting to read such an address or addresses, it can return the appropriate communications to the host device. (Again, the data that is returned in response to the read may comprise, e.g., commands, content or other data for the, e.g. client module on the, host device.)

Thus, in a particularly preferred embodiment, the host device, in order to transfer data and/or commands from the host device to the storage device, writes data to the storage device to an "input" address or addresses that has or have been predefined as being an address or addresses to be used for this purpose.

Similarly, the host device, in order to receive communications (data) that is intended for it from the storage device, reads data from an "output" address or addresses on the storage device that has or have been predefined as being an address or addresses to be used for that purpose. The storage device then recognises such reads and transfers the appropriate data, etc., to the host device in response thereto. The host device will know that any read it does from an output address should contain data, etc., that is for it.

In a preferred arrangement of these aspects and embodiments of the invention, the particular "input" and "output" address arrangements are achieved by defining special files in the address area of the storage device, a predefined "output" file or files from which communications for the host device can be read and a predefined "input" file or files to which communications from the host device for the "master" function storage device should be written. Then, the host device can communicate with the application on the storage device by reading an "output" file and writing to an "input" file, as appropriate. Such files may be created, for example, by manipulating the file access tables and directory tables for the storage device. There may be a single "output" and a single "input" file defined, or there may be plural input and/or output files.

In a particularly preferred embodiment, host device is configured to acknowledge data transfers that it receives from the storage device when an application is being executed on the storage device. This then allows the storage device to identify whether the host device has received the data transfer or not.

The present invention can be used in any microprocessor based system that uses storage devices to provide mass storage to the system. It is particularly advantageous for use in smaller and portable electronic devices that may have more limited resources. Thus it can in particular be used with portable and handheld devices, such as PDAs, mobile telephones, gaming devices, etc.

The various functions, modules and elements of the present invention can be carried out and implemented in any desired and suitable manner. For example, the functions of the present invention can be implemented in hardware or software, as desired. Thus, for example, the invention may comprise a suitable processor or processors, functional units, circuitry, processing logic, microprocessor arrangements, etc., that are operable to perform the various functions, etc., such as appropriately dedicated hardware elements and/or programmable hardware elements that can be programmed to operate in the desired manner.

Similarly, the computing environment and flash memory (mass storage) element, etc., can be physically arranged as desired on the storage device. For example, although in a preferred embodiment the computing environment is provided as a separate chip or chips to the flash memory element on the storage device, it would be possible to integrate the flash memory and the computing environment in a single chip, if desired. Similarly, the components of the computing environment, such as the application processing part, the interface processing part, the flash memory controller, etc., could all be provided on a single chip, or each as separate chips, or as any other suitable combination of chips, as desired.

As will be appreciated by those skilled in the art, all of the described aspects and embodiments of the present invention can include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The invention also extends to a computer software carrier comprising such software which when used to operate a microprocessor system comprising data processing means causes in conjunction with said data processing means said system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions fixed on a tangible medium, such as a non-transitory computer readable medium, for example, diskette, CD ROM, ROM, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which.

Figure 1:
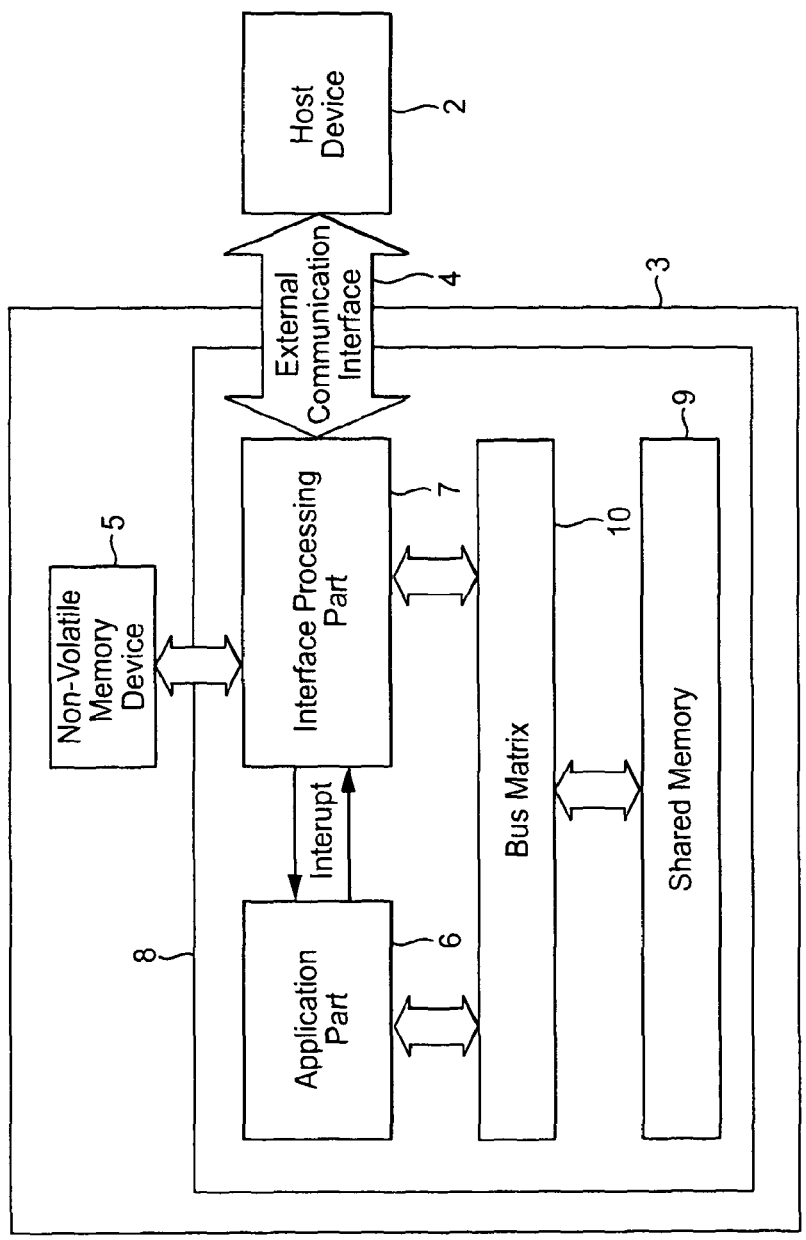
FIG. 1 shows schematically an embodiment of the present invention.

FIG. 1 shows an exemplary embodiment of a system that can be operated in accordance with the present invention. The system comprises a host electronic device 2 which in the present embodiment is a mobile phone, and a storage device 3, which in the present embodiment is in the form of an SD memory card, that is coupled to the host device 2.

Other host devices and storage devices would, of course, be possible. For example the host device may be a camera, a portable entertainment device, a PDA, a personal navigation device, an in-car navigation or entertainment system, a PC, an appliance such as a TV, printer or washing machine, etc. Similarly, the storage device could, for example, be a hard drive, a flash drive, or a USB memory stick.

As shown in FIG. 1, the memory card (storage device) 3 and the host device 2 communicate with each other via an appropriate device-host interface 4. In the present embodiment they communicate over a wired interface, as the memory card (storage device) 3 is received in a suitable SD card slot in the host device 2. Other arrangements, including a wireless link between the host 2 and the memory card would be possible if desired. The host device 2 and memory card communicate with each other using the appropriate SD card communication protocol.

The memory card (storage device) 3 further includes, as is known in the art, a flash (non-volatile) memory element 5 for providing mass storage functionality for the host device 2.

As shown in FIG. 1, the storage device 3 also includes a computing environment 8, which in this embodiment comprises an application processing part 6, a separate interface processing part 7, and a shared memory 9 for use by the application processing part 6 and the interface processing part 7 via a bus matrix 10 to communicate with each other. The computing environment 8 also includes a random access memory (RAM) that is usable by the processors of the computing environment.

In the present embodiment, the computing environment 8 is provided on a separate chip, with the flash memory element 5, for example, also being provided as a separate chip, with the various chips then being appropriately connected together and mounted on, in this case, an appropriate SD card (or micro SD card) substrate. Other arrangements, such as providing the computing environment 8, and flash memory element 5, etc., all on the same chip, or providing the components of the computing environment 8, such as the application processing part and the interface processing part, each as separate chips, would equally be possible, if desired.

The application processing part 6 of the computing environment 8 of the present embodiment comprises at least one CPU (or some other form of more general processor), a graphics processor (GPU), an internal RAM, debugging infrastructure, peripherals, power management, and clock control.

The application processing part 6 of the computing environment 8 is operable to execute one or more applications on the storage device 3. The applications may be stored, for example, in the flash memory element 5 of the storage device 3 and then loaded appropriately into the RAM of the application processing part 6 when they are to be executed. Applications can also be executed from the shared memory or directly from the flash memory.

The applications that may be executed in the application processing part 6 of the computing environment 8 of the storage device 3 may comprise any suitable and desired applications, such as games, productivity applications such as spreadsheets or word processors, Internet browsers, e-mail clients, video and audio editing tools, Internet applications, user interface applications such as stock viewers, weather programs, flight schedules, etc. The application processing part 6 could execute plural applications simultaneously and/or support plural applications, if desired.

In the present embodiment, the application processor or processors of the application processing part 6 also execute a driver for communication with the interface processing part 7, to allow the application processor to communicate with the interface processor. The interface processing part 7 is self-standing and all communication with the application processing part 6 is done via shared memory.

The interface processing part 7 of the computing environment 8 is a processing component that facilitates in particular transparent data communication between the host device 2 and the application processing part (system) 6. This then enables the application processing part 6 to provide additional computing power to the host device 7 through the mass storage communications interface 4 between the host device 2 and the storage device 3. In the present embodiment, as will be discussed further below, the interface processing part 7 is also configured so as to allow the host device 2 to access the normal mass storage functions 5 of the storage device 3 with minimal power consumption.

Thus, as well as its communication with the application processing part 6 of the computing environment 8 (which will be discussed in more detail below), the interface processing part 7 of the computing environment 8 is also able to communicate with the host device 2 and the normal flash memory element 5 of the storage device 3. It accordingly has appropriate communications interfaces to the host device 2, and to the non-volatile memory element 5, and to the application processing part 6 of the computing environment 8 of the storage device 3.

In the present embodiment, the interface processing part 7 of the computing environment 8 on the storage device 3 performs the following functions: transfer of data between the host device 2 and the application processing part 6 of the storage device; memory card mode handling for the host device; initialization of the application processor in the application processing part 6; initialization and handshaking with the host device 2; and providing the nonvolatile storage device functions to the host device 2.

To achieve this, in the present embodiment, the interface processing part 7 of the computing environment 8 on the storage device 3 includes: a CPU or other controller able to control the components of the interface processing part 7, carry out initialisation and handshaking functions, etc.; an external interface controller to the host device (in the present embodiment, as the storage device 3 is an SD card, this interface controller comprises a SecureDigital controller; however a USB or other interface supporting mass storage access from a host device controller could be used, if desired, depending upon the nature of the storage device); a non-volatile memory controller (this can, e.g., be a NAND flash device controller, NOR flash controller or other controller that performs lower level access to a non-volatile storage device); some internal system memory (for use as working space memory); a debugging infrastructure (such as jtag, uart etc.); a component for compression and encoding of video, audio or data; a boot ROM for booting of the system and storing application code; an interrupt controller with connection to all the application processor interrupt sources and internal interrupt sources; and some secure storage for storing authentication keys to be used to secure the boot procedure (not shown).

Other arrangements, and functionality, etc., for the interface processing part 7 of the computing environment 8 of the storage device 3 would, of course, be possible.

The interface processing part 7 of the computing environment 8 also includes, as discussed above, a processor (which may be a CPU, dedicated hardware, etc., as desired) operable to interface (translate) between a communications protocol used between the host device 2 and the storage device 3, and a communications protocol required or expected by an application being executed on the application processor in the application processing part 6 of the storage device 3. This interface processor may be the same as or different to the processor (e.g. CPU) that controls the components of the interface processing part 7.

The interface (translation) function of the interface processor is operable to take data received from the host device and convert it to the appropriate data structures that the application processor(s) uses, and vice-versa. Thus, the interface processor accordingly translates between the application processor and the data protocol used between the storage device 3 and the host device 2.

In the present embodiment, the interface processor, as well as being able to convert data between the protocol required for communication with the host device, and the protocol required by application processing part, is also able to encode and/or compress data to be sent to the host device. This reduces the data transfer requirements for sending data to the host device 2, and accordingly reduces power usage, for example.

In the present embodiment, the communications interface part between the interface processing part 7 and the host device 2 comprises a mass storage communications interface (an interface that supports mass storage access from a host device) in the form of an SD interface (other arrangements, such as a USB interface for communicating with the host device could be used, e.g. depending upon the nature of the storage device 3).

In the present embodiment, communication between the interface processing part 7 and the application processing part 6 of the computing environment 8 of the storage device 3 takes place, as shown, via shared memory 9. This is advantageous from a hardware perspective and may also, e.g., facilitate enhanced security.

Thus, the interface processing part 7 of the storage device 3 includes appropriate elements and functionality for communicating with the application processing part via the shared memory 9, and the application processing part 6 correspondingly includes appropriate elements and functionality for communicating with the interface processing part via the shared memory 9. Thus, the interface processing part 7 accesses data structures stored by the application processing part 6 in the shared memory 9 to receive communications from the application processing part 6 and vice-versa.

Thus, in the present embodiment, the interface processing part 7 is operable to fetch data structures that have been written to the shared memory 9 by the application processing part 6, and to process those data structures into a form suitable for transfer to the host device 2, and is operable to process data structures received from the host device 2 into a form suitable for transfer to the application processor 6 and to write those data structures to the shared memory 9 for use by the application processing part 6.

An interrupt mechanism is also provided between the application processing part 6 and the interface processing part 7 of the computing environment 8 on the storage device 3, to facilitate communication between the application processor and the interface processor and vice-versa. This interrupt mechanism may then be used, e.g., to cause the application processor to respond to inputs from the host device 2 (the client side) that have been processed by the interface processor (and, e.g., placed in the shared memory 9).

The interface processing part 7 accordingly includes an interrupt controller, which interrupt controller is coupled to all the interrupt sources of the application processing part 6, and all the internal interrupt sources of the interface processing part 7.

In the present embodiment, interrupts from the application processing part 6 to the interface processing part 7 are carried out by having all the application processor interrupts available on the interrupt controller of the interface processing part 7.

Other arrangements would be possible. For example, the application processor interrupts could also or instead be handled by the application processor interrupt controller, with interrupts needed for the interface processing part 7 being raised by writing to an interface processing part register. It would also or instead be possible, e.g., to have an extra interrupt controller in the application processing part 6 that groups all interrupts to the interface processing part 7, and makes all application processing part interrupts available to the interface processing part.

The interface processing part 7 has the ability to interrupt the application processing part 6 via an interrupt signal exiting from the interface processing part.

In this way, the interface processor in the interface processing part 7 communicates with the application processor in the application processing part 6 of the computing environment 8 via interrupts and the shared memory 9.

Where the interface processing part includes separate controller component (such as an SD controller, a flash controller, etc.) inside the interface processing part, then the application processing part can preferably access these components.

The components of the interface processing part, such as the nand flash controller, physical interface controller, etc. are accessed by the application processing part over a shared bus. Access from the application processing part to these components is controlled by the interface processing part.

As discussed above, in the present embodiment, the interface processing part 7 controls access to and from the non-volatile mass storage 5 of the storage device 3. Thus, the interface processing part 7 provides the "normal" mass storage functionality of the storage device 3 to the host device 2.

To do this, the interface processing part 7 includes a suitable mass storage (non-volatile memory) controller, such as a NAND or NOR flash device controller, or other controller that performs lower level access to a non-volatile storage device. It also executes a suitable mass storage device driver, which in this embodiment is an SD-card controller driver.

In the present embodiment, the interface processing part 7 controls access by the application processing part 6 to areas of the mass storage (flash memory) 5 on the storage device 3, and controls access by the host device 2 to areas of the mass storage (flash memory) 5 on the storage device 3.

This has the effect that all access to the mass storage 5 on the storage device 3 requires permission of the interface processing part 7, such that the interface processing part accordingly acts as a firewall between the host device 2 and the mass storage 5 on the storage device 3, and between the application processing part 6 and the mass storage 5 on the storage device 3. This can enhance the security of the system, for example by preventing malicious code from being transferred from a host device to the application processing part and vice-versa.

The computing environment 8 is configured so as to only enable (boot) the interface processor (the interface processing part 7) on the storage device 3 at power up. This helps to ensure lower power usage. It also has the advantage that where the application processor(s) is not needed, e.g., because the host device 2 simply requires mass storage operation, then the application processor does not need to be enabled, thereby saving power, etc. (as the interface processor alone supports that).

Also, only a minimum of components run at power up and the interface processor runs at a lower clock frequency until it receives a request for more performance (at which point it can then increase the clock frequency, control the power controller, etc., to provide increased performance).

The interface processor (the interface processing part 7) may be booted as desired. In the present embodiment, the interface processing part 7 has a boot ROM and boots from that boot ROM. Once it has started to boot, the interface processor then continues to boot using data and code stored in the mass storage memory 5 of the storage device 3. It can also use data and code stored on the host device 3 and/or from over the Internet for this, if required (e.g. where the relevant data is not yet stored in the memory 5 on the storage device).

Figure 11:
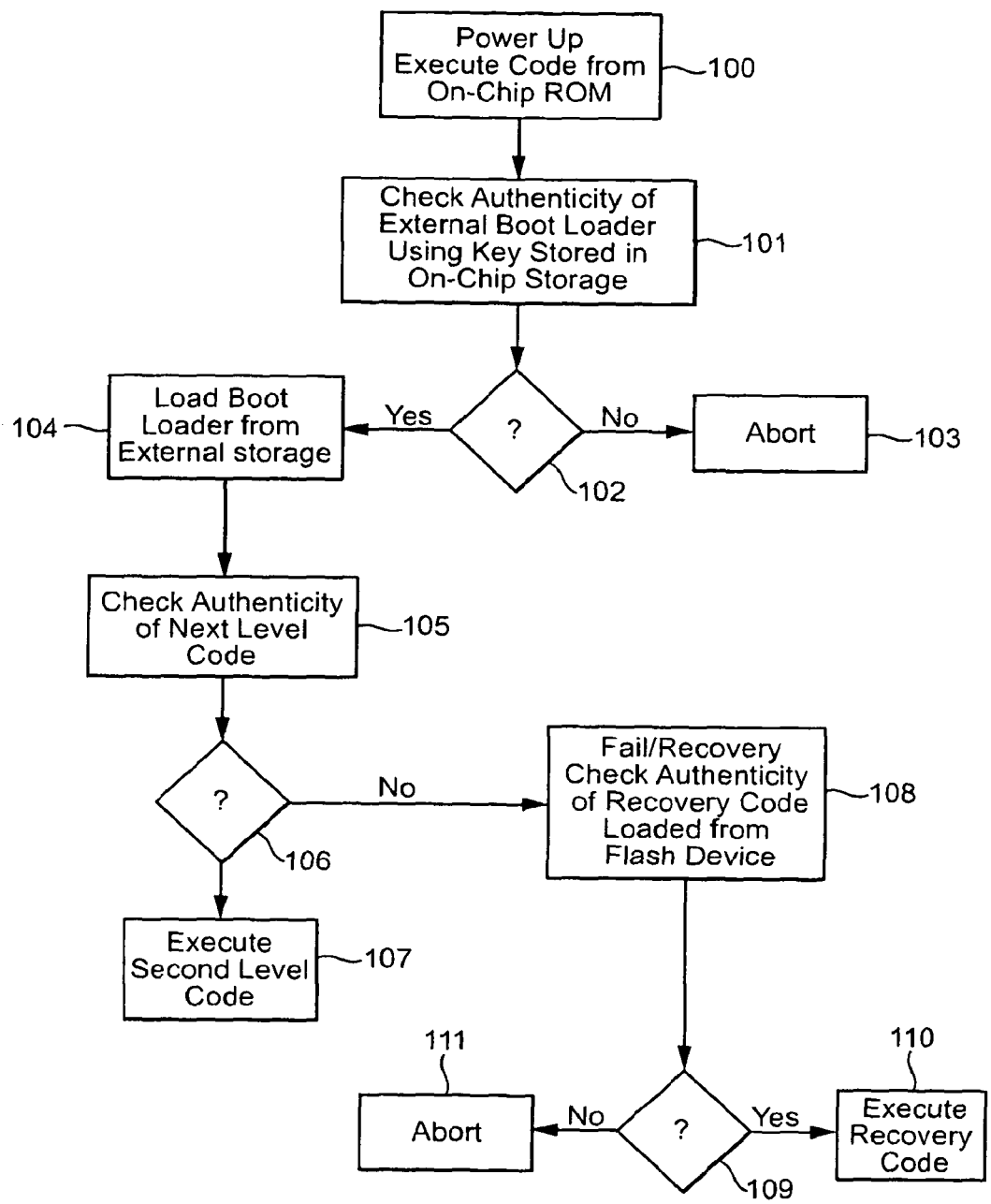
FIG. 11 shows the boot sequence used for the interface processing part in the embodiment shown in FIG. 1.

FIG. 11 shows the procedure that is used for booting the interface processing part 7 in the present embodiment in more detail.

As shown in FIG. 11, when the interface processing part is first powered-up, it will proceed to execute boot code that is stored in the boot ROM that is present in the interface processing part 7 to start the boot procedure (step 100).

Once this boot code has been executed, the interface processing part 7 then checks the authenticity of the boot loader data and code that is stored in the external mass storage memory 5 of the storage device 3 (step 101). In the present embodiment this is done by reading a public authentication key that is stored with the boot loader code in the mass storage memory 5 of the storage device 3, and then comparing that authentication key (or, e.g., a hash of that key) with a copy of the key (or of a hash of the key, respectively) that is already contained in a secure storage section of the boot ROM of the interface processing part 7.

If this authenticity check (step 102) indicates that the keys (or the hashes of the key) do not match, then the boot procedure is aborted (step 103). This is because if the authentication check is not successful, that would suggest that the boot code in the mass storage memory 5 of the storage device 3 has been modified or otherwise interfered with, and therefore that security has potentially been breached.

On the other hand, if the authenticity (security) check (step 102) is successful, then the interface processing part 7 can proceed to load and execute the boot loader data and code from the mass storage memory 5 of the storage device 3 to continue with the boot procedure (step 104).

When the next level of boot loader code (such as, e.g., kernel, OS, or special application code) is to be executed, a further authenticity (security) check for that next level of boot code is performed (step 105). This authentication check again preferably comprises comparing a key or a hash of a key that is stored in association with the next level of boot code in the mass storage memory 5 of the storage device 3 with a corresponding version of that key (or hash of that key) that is stored in the secure storage of the interface processing part 7.

If this security check (step 106) is successful, then the boot procedure will proceed to execute the second level boot code stored in the mass storage memory 5 of the storage device 3 (step 107), after which the boot procedure is completed and the interface processing part 7 will be enabled.

At this stage, for example, a kernel stored in the mass storage memory 5 of the storage device 3 will mount file systems according to the desired set-up, and continue with user space initialisation. This will then start the necessary applications and GUI for the device to become enabled.

If the second level of boot code authenticity check fails at step 105, then the interface processing part enters a recovery boot procedure (step 108).

In the recovery boot procedure, the system can attempt a recovery boot. In this arrangement, the interface processing part 7 attempts to boot from a rescue image (comprising boot loader code and data) that is provided on a further external storage device, such as an SD card, that may be provided by the user and coupled to the storage device 3. Again, if an attempt to boot using this rescue image is to be made, the interface processing part 7 first carries out an authentication check to determine whether an authentication key (or a hash of that key) that is stored in the boot rescue image on the external storage device matches the key (or hash) value stored in the boot ROM of the interface processing part 7. (The authentication key that is stored in the boot rescue image may be a signature that is generated from a secure private key, for example.)

If this authentication procedure (step 109) is successful (thereby indicating that the rescue image on the external storage device has not been tampered with), then the interface processing part proceeds to execute the recovery code (step 110) on the external storage device and proceeds with the normal boot procedure using the rescue image in the manner described above.

The rescue image (boot code and data) could, e.g., be executed directly from the external storage device, or it could, e.g., be loaded from the external storage device on to the storage device 3, by copying the rescue image from the external storage device to the mass storage memory 5 of the storage device 3, and then, once the rescue image has been copied to the mass storage memory 5 of the storage device 3, the system could proceed with the normal boot procedure using the rescue image copied to the mass storage memory 5 of the storage device 3 in the manner described above.

If the check of the rescue image on the external storage device fails, then the procedure is aborted (step 111).

This latter recovery procedure (i.e. executing a rescue image from an external storage device and then proceeding to boot from that rescue image), can also be used, if desired, for initial booting of the system for the first time, in the situation where, for example, there is no boot data and code yet stored in the mass storage memory 5 of the storage device 3, or for system recovery or system maintenance. In these arrangements, the "rescue image" could, e.g., be copied to the mass storage memory 5 of the storage device 3, so that the system can subsequently be booted from boot code and data that is stored in the mass storage memory 5 of the storage device 3.

The application processor (the application processing part 6) is enabled (booted) at a later time, after the interface processor (the interface processing part 7) has been booted, and only in response to some event that indicates a need for the application processor (for the application processing part 6). In the present embodiment, the triggering event is an appropriate user input on the host device, such as the activation of a client application on the host device. In response to this, the system will then start to boot the application processor (the application processing part 6) on the storage device 3. The application processor is preferably booted by means of the interface processor giving the relevant mass storage boot address to the application processor.

Thus, in the present embodiment, the computing environment 8 on the storage device is enabled (booted) in two stages, firstly (at power up) to a mass storage operation mode by booting the interface processor only, and, if required, then, in a second, subsequent stage, to a full application processing mode by booting the application processor(s). (Other arrangements would, of course be possible.)

In the present embodiment, the storage device 3 is also configured such that the application processor (the application processing part 6) will only be enabled (booted) if the coupled host device 2 can provide the necessary power, performance, etc. to support such operation.

As well as supporting the execution of an application on the storage device 3, the computing environment 8 of the storage device 3 is operable to execute a set of software components that together provide a server module (a server function) on the storage device 3. There is a corresponding set of client software components on the host device 2 that together provide a client module (a client function) on the host device 2 that can cooperate with the server module (function) on the storage device 3 to allow an application that is being executed in the computing environment 8 of the storage device 3 to access and use, inter alia, input and output functions of the host device 2. In effect, the server components running in the computing environment 8 constitute a server module that allows the storage device 3 to act as a master controlling functions of the host device 2, via a corresponding client module formed by the client components of the host device 2. The arrangement is such that the host device 2 can act as a thin client providing user input and output functions and connectivity with the Internet for an application that is running in the computing environment 8 on the storage device 3.

In the present embodiment, the server module is executed in the interface processor on the interface processing part 7 of the computing environment 8 (i.e. the interface processing part provides the server function on the storage device 3). This avoids stealing any performance from the application processor and the application processing part 6 for performing the server function. However, other arrangements, such as running the server module in the application processor in the application processing part 6, or in a distributed fashion across both the interface processing part 7 and the application processing part 6 on the storage device 3 would be possible, if desired.

The operation of the server module and client module in the present embodiment will now be described.

Figure 2:
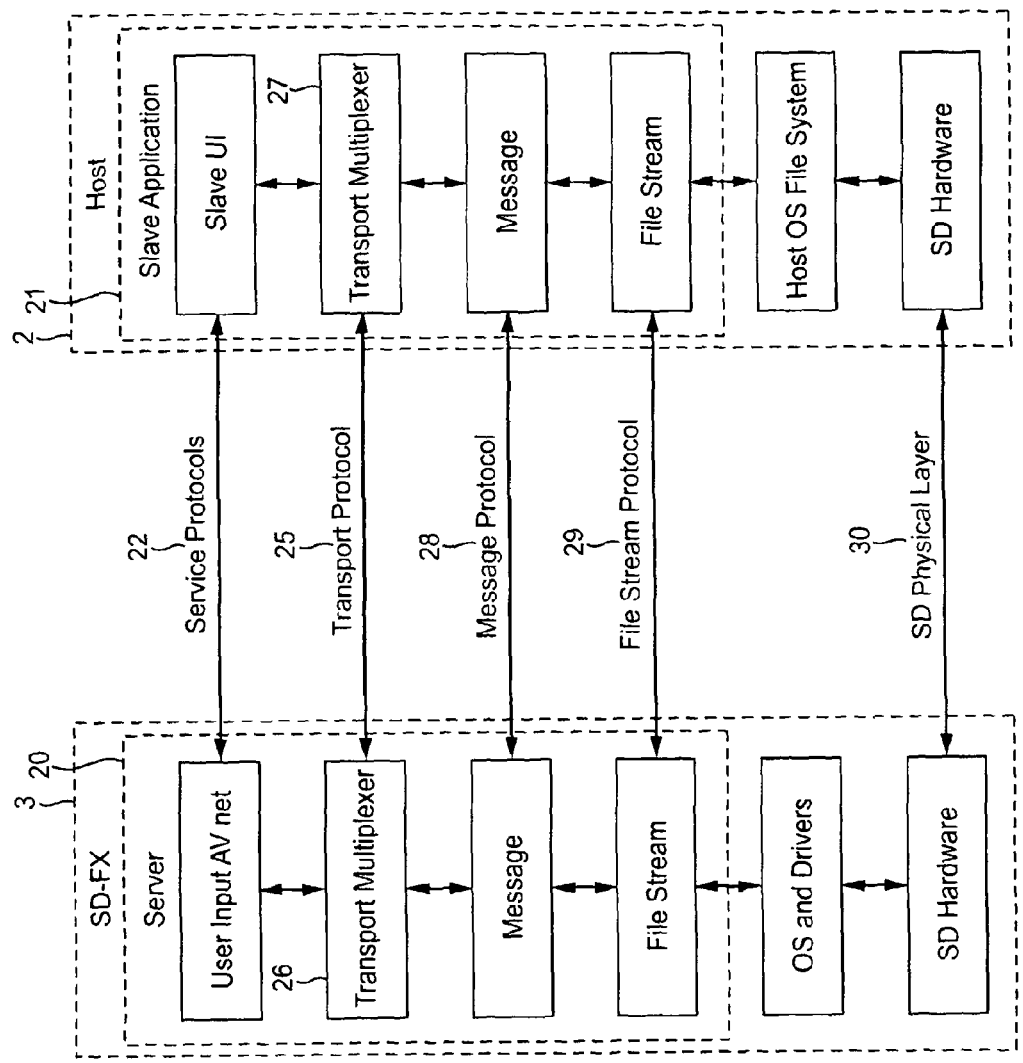
FIG. 2 shows schematically a protocol stack used in the embodiment shown in FIG. 1.

FIG. 2 shows schematically the relevant server 20 and client 21 software stack and protocols that are provided on the storage device 3 and the host device 2, respectively. The software running in the computing environment 8 of the storage device 3 (in the interface processing part 6 of the computing environment 8 in the present embodiment) acts as the "master" and the client software running on the host device is the corresponding "slave". Communications between the respective layers of the protocol stack over a defined protocol are shown with dashed lines in FIG. 2, while actual physical communication paths are shown with solid lines.

As shown in FIG. 2, the top protocol layer is the service layer 22.

Each application that may be executed on the storage device 3 has access to an API which provides all operating system and input/output functionality for the application. The API is implemented either as shared or static libraries and therefore runs in the same context as the application.

The API libraries provide the service protocol layer 22 which is a set of protocols for different services which the client module on the host device will provide for the application that is running on the storage device, such as access to the display, buttons and Internet on the host device (in effect, a slave user interface, etc., on the host device). In the present embodiment, each service is one specific functionality, such as graphics output or key press events.

Each service has a defined service protocol, and represents a certain capability, such as a key input service. In operation, when a service is in use, a "channel" linked to the service is opened through which, for example, events relating to the service can be sent and received. For example, if a slave host device registers a key input service, the master server component on the storage device can open a channel linked to that key input service and then receive key input events through that channel. Several channels can be opened to the same service (and all channels must be linked to a service).

The next layer down in the protocol stack is the transport protocol layer 25. There is a corresponding transport multiplexer component 26, 27 in the server module 20 on the storage device 3 and in the client module 21 on the host device 2.

The transport protocol layer 25 acts to combine the plural individual service channels of the service protocol layer 22 into a single channel for communications that are passing down the protocol stack from the service protocol layer, and, correspondingly, acts to de-multiplex the single "channel" that it will receive from the lower message protocol layer 28 (which will be discussed further below) into the appropriate number of individual channels needed for the service layer 22. The latter is accomplished by tagging messages received from the message protocol layer 28 with the appropriate channel numbers.

The protocol layer below the transport protocol layer 25 is the message protocol layer 28. The purpose of this protocol is to provide the higher layers of the protocol stack with the possibility of sending and receiving messages of arbitrary length (whereas, as will be discussed further below, the lower layers of the protocol stack are constrained to send messages of fixed, or at least predetermined, length).

The message protocol uses message protocol packets which have the following structure:
  bytes 0-3: number of bytes in the payload
  bytes 4-7: number of FAT stream packets this message is composed from
  bytes 8-: payload.

To do this, the message protocol operates to segment messages that it receives from the higher layers (from the transport protocol layer 25) into the FAT stream packets that the lower file stream protocol layer 29 uses (as will be discussed further below), and, similarly, for communications received from the file stream protocol layer 29 for provision to the higher layers, acts to concatenate the FAT stream packets that it receives from the file stream protocol layer 29 into longer messages.

The next layer down the protocol stack is the file stream protocol layer 29. The purpose of this layer is to make sure that the packet transport over the SD physical layer 30 (which is the actual physical communication medium that is used between the server module on the storage device 3 and the client module on the host device 2) is reliable and efficient. The communication arrangement over the SD physical layer 30 will therefore first be described, before returning to a more detailed description of the file stream protocol 29.

As shown in FIG. 2, the physical communication between the storage device 3 and the host electronic device 2 takes place via the SD interface (the SD physical layer) (as the storage device 3 is in this embodiment an SD card). This physical layer is used for all communications between the storage device 3 and the host device 2, including the communication between the storage device 3 and the host device 2 when the storage device 3 is acting as a master to the host device 2. This has the advantage that the host device 2 and storage device 3 continue to operate in their normal fashion with respect to the physical layer, notwithstanding that the host device 2 may in fact be acting as a slave for an application that is running on the storage device 3.

The SD physical layer 30 follows the SD standard. Thus, as known in the art, in the present embodiment, communication between the storage device 3, and the host device 2, including all communications relating to the client and server operation, takes place via data transfers of blocks of 512 bytes, with each block having an address, starting at 0 and increasing, in accordance with the SD protocol.

As in normal SD card operation the memory card storage device 3 would handle every block address as either a read or write to the corresponding block in the flash memory element 5, in the present embodiment the block addresses that the host device 2 may read from or write to are classified into three different types, such that depending upon which address the host device is reading from or writing to, the storage device (namely the server module on the storage device) can interpret that data transfer accordingly.

The first type of block address is any block address that is in the address space of the flash storage area 5 of the storage device 3. If the host device reads from or writes to such a block address, then the server module on the storage device 3 allows the normal SD card operation to be carried out (namely a read of or write to the appropriate flash storage area). Blocks having these addresses can accordingly be thought of as "normal" blocks.

However, in order to facilitate the server/client operation of the present embodiment, two further types of block address defined and that, in particular, the server module on the storage device 3 can recognise.

The first such block address is an "input" block address. If the server module on the storage device 3 sees the host device 2 writing to such an "input" block address, that is interpreted by the server module on the storage device 3 as being a data transfer from the client module on the host device for processing by the server module on the storage device 3. The server module 3 is accordingly configured to recognise when the host device writes blocks to an "input" block address and in response thereto to pass the blocks for processing by the higher levels of the server module protocol stack. This then allows the client module on the host device 2 to send communications for the server module (for an application being executed on the storage device 3) on the storage device 3 by writing blocks to the defined input block addresses.

There is correspondingly a defined set of "output" block addresses. These addresses are used for communication from the server module on the storage device 3 to the client module on the host device 2. When the server module on the storage device 3 sees the host device 2 reading from one of the defined "output" block addresses, the server module on the storage device 3 again intercepts that "read" and transfers the next waiting messages from the higher levels of the server module protocol stack to the host device 2 (to the client module on the host device 2). (The client module "knows" that it has read an output address and so treats any data transferred in response to that read as data that it should process.)

Figure 3:
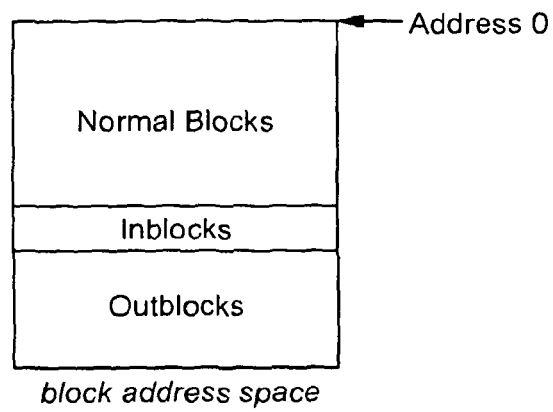
FIG. 3 shows schematically the block address space on the storage device of the embodiment shown in FIG. 1.

FIG. 3 shows schematically the above block address space arrangement on the storage device 3.

The "normal blocks" have addresses within the normal address space of the flash memory element 5 on the storage device 3, and, as discussed above, any read or write to such a normal block address results in the same behaviour as would normally be the case for the storage device 3, namely appropriate reads or writes to the flash storage area 5.

The input block and output block addresses shown in FIG. 3 are, on the other hand, not within the normal address space of the flash memory element 5, but are instead, in effect, "virtual" addresses that are used to trigger the transfer of data between the server and client modules on the storage device 3 and the host device 2. Thus, as discussed above, writes to input block addresses and reads of output block addresses by the host device 2 do not result in writes to or reads of, respectively, corresponding block addresses in the flash storage element 5, but are instead "intercepted" by the server module on the storage device 3 and interpreted appropriately either as communications from the client module to the server module or requests from the client module to receive communications from the server module (with the server module then responding appropriately).

To facilitate the above "input" and "output" block address operation, two special files are created by the server module on the storage device 3 through manipulation of the file access tables and directory tables in the flash storage area 5 of the storage device.

One of these files, called in the present embodiment /fxiout.str, has all the output blocks allocated to it, such that any read from this file will result in a read from an output block (and so is used for communication from the server module on the storage device to the client module on the host electronic device).

The other file, called in the present embodiment /fxiin.str, has all the input blocks allocated to it, such that any write to this file will result in a write to an input block (and so is used for communications from the client module on the host device to the server module on the storage device).

In this way, the client module on the host electronic device can read /fxiout.str or write to /fxiin.str in order to communicate with the server module on the storage device 3.

The above describes the data transfer protocol for the physical layer 30. However, the Applicants have recognised that it may be necessary to take steps to ensure that the data transport over the physical layer 30 in the manner discussed above is reliable and efficient. As discussed above, this is the function of the file stream protocol layer 29.

The file stream protocol 29 transfers data between the client and server modules in the form of file stream packets.

Each file stream packet fits into one 512 byte SD block and includes a packet header and a payload. The payload is the useful data that is being transferred between the server module and the client module and can comprise, for example, commands, content or other data. (As will be appreciated by those skilled in the art, each file stream packet should be configured to be of an appropriate size for the storage device (physical) communication protocol in question. Thus, although as set out above in the present embodiment the file stream packets are configured to fit within SD blocks, for other forms of storage device, other sizes of file stream packet could and preferably should, be used.)

Figure 4A:
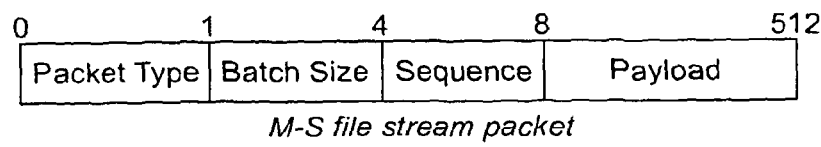
FIG. 4A shows schematically the structure of the file stream packets that are transferred between the storage device and the host device in the embodiment of FIG. 1.

In the case of file stream packets being sent from the server module on the storage device 3 to the client module on the host device 2 (i.e. in essence for "output", master-to-slave (M-S) file stream packets), the packet header has three fields, a packet-type field, a packet sequence number and a packet batch size. This is shown in FIG. 4A.

The packet-type field indicates either NO DATA (0) or DATA (1). DATA packets are packets having payloads that are to be processed by the receiver. NO DATA packets are used to "pad" data transfers when there are no DATA packets ready to be sent to the client module.

The packet sequence number is unique and increasing. As will be discussed further below, this is used by the client module to determine if its packet read was incorrect or not.

The packet batch size field indicates the number of file stream packets in the batch to which the packet in question belongs. (The use of this will be discussed below.)

Figure 4B:
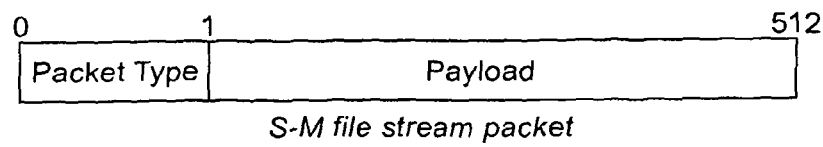
FIG. 4B shows schematically the structure of the file stream packets that are transferred between the storage device and the host device in the embodiment of FIG. 1.

In the case of file stream packets sent from the client module on the host device 2 to the server module on the storage device 3 (i.e. for slave-to-master, S-M, file stream packets), the packet header simply includes a packet-type field. This is illustrated in FIG. 4B. In this case, the packet type field may indicate either DATA (1) or an acknowledgement, ACK(0x80), or a bit-wise OR of these two types. Any data packet sent from the client module can be flagged as an ACK packet. If the client module needs to send an ACK packet when there are no DATA packets waiting, a NO DATA packet with an ACK flag is created.

For communications from the client module on the host device 2 to the server module on the slave device 3, the client module is configured simply to write appropriate file stream packets to the input file, /fxiin.str, when it has data to transfer. As discussed above, the server module on the storage device 3 when it sees the host device writing to the file /fxiin.str will recognise those data transfers as being data transfers for the server module and so "intercept" such data transfers and pass the file stream packets up the server module protocol stack for processing.

For the case of communications from the server module on the storage device 3 to the client module on the host device 2, again the basic operation of the file stream protocol is to send appropriate file stream packets to the host device 3. However, because of the nature of the communication between the host device 2 and the storage device 3, a number of steps are taken in the present embodiment in order to try to enhance the reliability and efficiency of the server to client communication. In particular, the Applicants have recognised that it may be necessary to take steps to allow for the fact that in the normal course, the expected operation of a host and storage device arrangement is that the host device will act as a master accessing the slave storage device, and it will be assumed that the storage device will not itself contain any "intelligence".

In the first place therefore the client component of the file stream protocol operates so as to cause the host device to periodically attempt to read the /fxiout.str output file on the storage device 3. This is because any reads of the storage device by the host device must be triggered by the host device itself, as that is the only mechanism that is provided in normal host storage device operation for reading the storage device. The client mode therefore causes the host device to poll the storage device periodically, to see if there are any communications from the server module on the storage device waiting.

The output file stream packets to be transferred to the host device when the host device reads the /fxiout.str file are grouped into batches of plural file stream packets, with each batch including up to the number of file stream packets (i.e. SD blocks) that the host operating system will as a minimum read for each read request. The batch size field in the file stream packet header discussed above indicates the number of file stream packets in the batch to which the packet in question belongs.

This has the advantage of helping to avoid wasting bandwidth when the host device reads the /fxiout.str file, for example where the host device operating system will tend to read more than one block from the storage device in any given read request. Grouping the output file stream packets into batches can help to ensure that each read by the host operating system is "filled" with useful file stream packets.

The file stream protocol is further configured such that the server module on the storage device 3 does not consider a packet batch to have been successfully sent to the client module on the host device 2 until it receives an acknowledgement (ACK) packet from the host device 2. Before this acknowledgement packet is received, the server module keeps resending the same file stream batch every time the host device reads the output file, /fxiout.str. This helps to avoid problems with file stream packets getting lost due to host device operating system reads which the client module has no control of.

To facilitate such acknowledgement operation, the file stream protocol packets include, as discussed above, a packet sequence number in their headers. This packet sequence number is unique and increasing and is used by the client module on the host device to detect if its file stream packet read was correct or not.

If a file stream packet arrives from the storage device with a sequence number that the client module has already processed, the client module considers that an error has occurred (e.g. that the read has in fact come from the host device's cache), and so discards the packet and continues to send its read requests without sending an acknowledgement.

Once the client module receives a complete packet batch with all the file stream packets having the correct sequence numbers, it can be concluded that the batch has been received and read correctly, and so the client module then sends an acknowledgement (ACK) file stream packet to the storage device (by writing the ACK file stream packet to the file /fxiin.str).

The server module on the storage device 3, when it receives this acknowledgement file stream packet from the client module on the host device 2, can then note that the current batch has been successfully received by the client module and so return the next packet batch when the host device 2 next reads the output file /fxiout.str.

The server module further operates in the present embodiment to ensure that the /fxiout.str file contains more output blocks than the host device can keep in its cache. The client module on the host device 2 is correspondingly configured to read blocks from the /fxiout.str file in a random order. Together, this has the effect that any given read of the /fxiout.str file by the host device 2 will tend to result in a cache "miss", thereby forcing the host device to read from the storage device itself.

This helps to avoid any caching operation on the host device 2 preventing the client module on the host device 2 from receiving new communications from the server module on the storage device 3. In particular, the Applicants have recognised that in normal operation of reading from the storage device 3, the host device 2 may cache a batch of blocks it has read from the storage device 3 and then reread the cached data blocks for subsequent reads of the same file. This could mean that new output packets from the storage device 3 might not be read by the host device, because the host device will tend to make any subsequent reads from its own cache instead of from the storage device. Arranging the output file reading operation to tend to cause the host to encounter cache misses, helps to avoid this problem.

Other arrangements to avoid the host tending to read only from its cache could also or instead be used if desired. For example, if the cache operation on the host device can be disabled, then the client module could be configured to disable the cache operation to ensure that the host device always reads from the storage device and not simply from its cache.

(Any caching operation on the host device should not cause any problem in respect of communications from the client module on the host device 2 to the server module on the storage device 3, because the host device 2 should support FSYNC( ) or equivalent functionality which ensures that any cache changes will always be written back to the storage device 3 in any event.)

Figure 5:
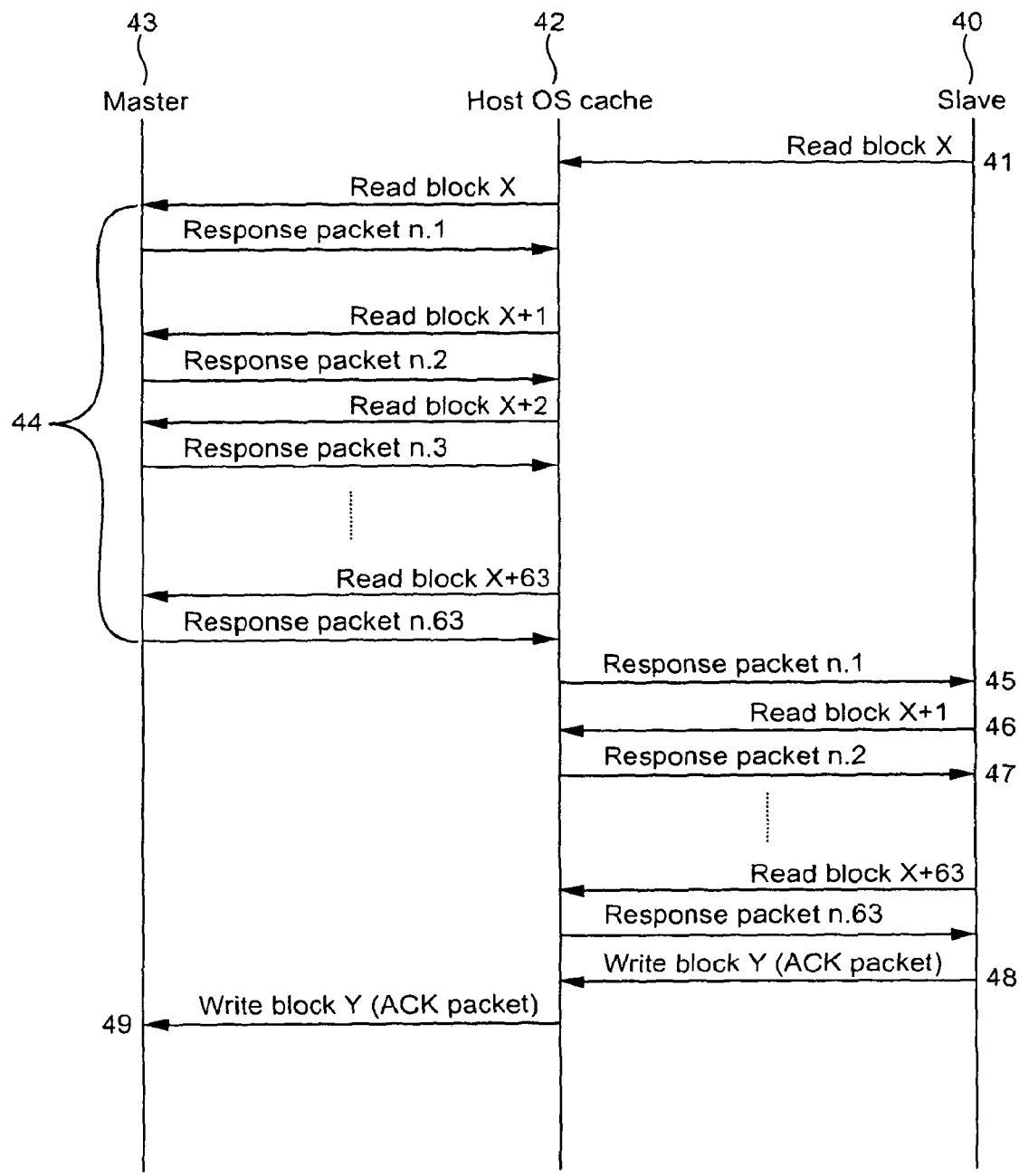
FIG. 5 shows the sequence of actions for a packet read from the host device in the embodiment of FIG. 1.

FIG. 5 shows schematically the sequence of actions for the client module on the host device when making a read of the output file /fxiout.str on the storage device 3 in accordance with the above arrangement (and in the ideal case where the single read is successful).

As shown in FIG. 5, the sequence starts with the client module (the "slave") 40 on the host device 2 making a read of a random output block X from the file /fxiout.str (step 41). This read instruction is passed to the host operating system cache 42, which then proceeds, in accordance with its normal procedure, to in fact cache 64 consecutive blocks from the file /fxiout.str from the master storage device 43. Thus, as shown in FIG. 5, the host operating system cache 42 first reads block X and the server module on the master storage device returns output block (file stream packet) number 1. The cache then reads address block X+1 and the server module returns file stream packet number 2, and so on, until 64 consecutive blocks have been requested and returned to the host operating system cache (step 44).

It should be noted here that in this example the batch size is set to 64, so the master server module 43 on the storage device 3 will deliver 64 file stream packets (blocks) to the cache 42. If the cache 42 were to request more blocks than there are file stream packets in a batch, then the master server module 43 would resend all packets until an acknowledgement is received.

Once the host operating system cache 42 has cached all 64 consecutive blocks, it can then return the first packet number 1 to the slave client module 40 (step 45). The slave client module 40 will then attempt to read the next block, X+1. In response to this read, the host operating system cache 42 will return the next packet, packet number 2 (steps 46, 47) and so on.

This will continue until the slave client module 40 has read and received all 64 packets in the batch from the cache 42. Assuming that all the packets in the batch have been correctly and successfully received by the slave module 40, it will then write an acknowledgement block (step 48) to the file /fxiin.str, which will be written back to the storage device 3 via the host operating system cache (step 49).

FIGS. 6-9 show schematically the use of the present invention to execute an application on a mobile phone.

Figure 6:
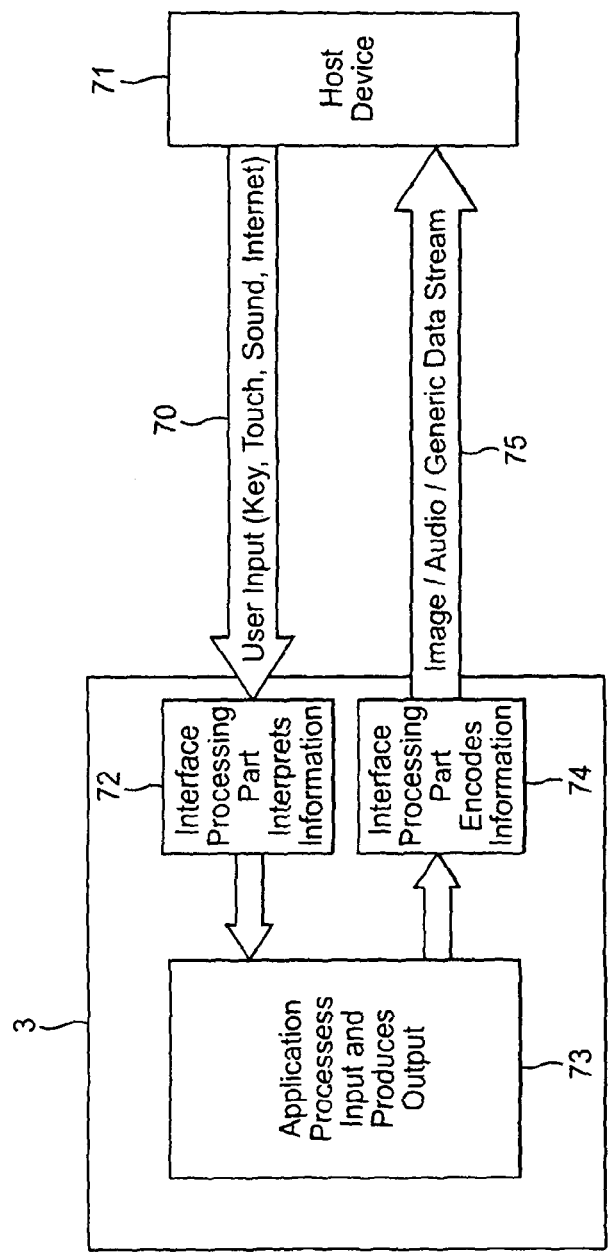
FIG. 6 shows an example of the operation of the embodiment of FIG. 1.

FIG. 6 shows schematically the general operation of the system of the present application when an application is being executed on the storage device. As shown in FIG. 6, user inputs 70 such as key presses, audio inputs, Internet information, etc., will be sent from the host device 71 and interpreted by the interface processing part 72 of the computing environment on the storage device 3 which will provide them in an appropriate form to the application processing part 73 on the storage device 3. The application processing part 73 of the storage device will then process the inputs and produce an appropriate output which will then be passed to the interface processing part for appropriate processing and encoding 74 into a form for returning as an image, audio or other generic data stream 75 to the host device 71 for output (e.g. display, sound, etc.) to the user. This process is then repeated as appropriate as the user uses the application being executed on the storage device.

Figure 7:
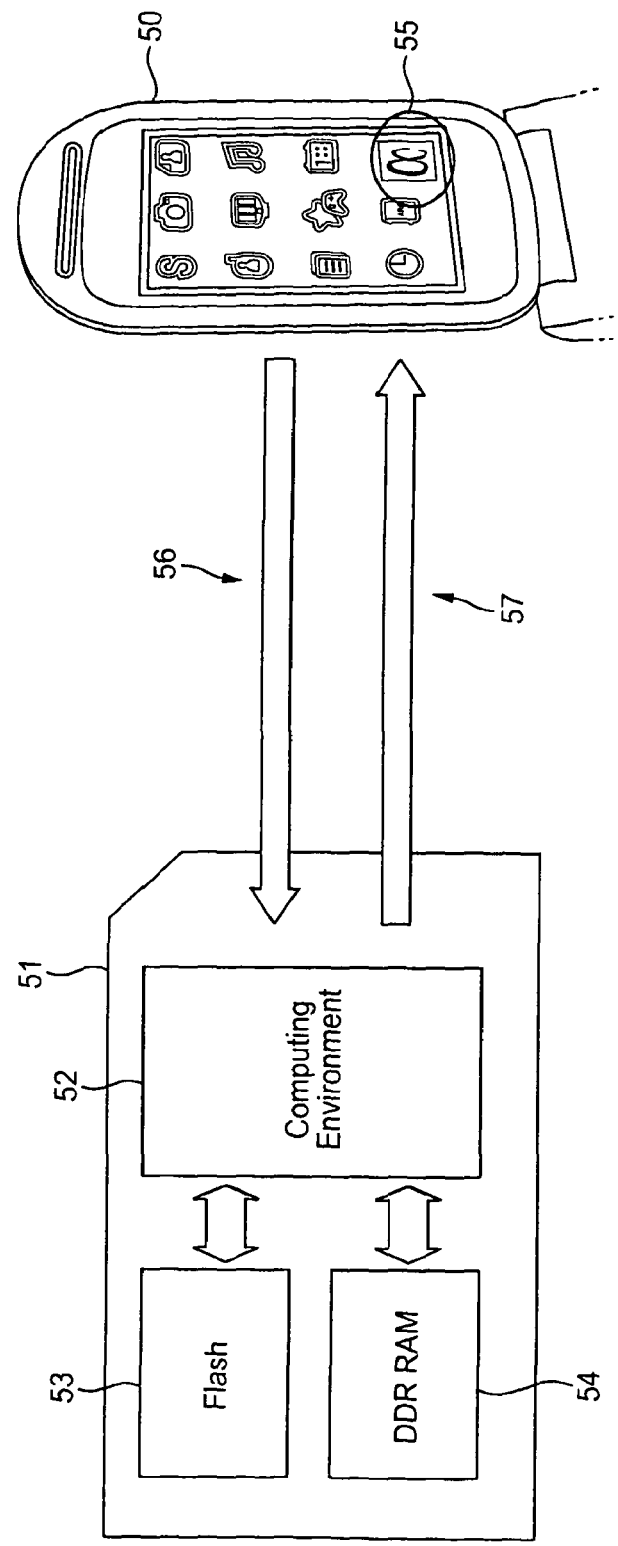
FIG. 7 shows an example of the operation of the embodiment of FIG. 1.
Figure 8:
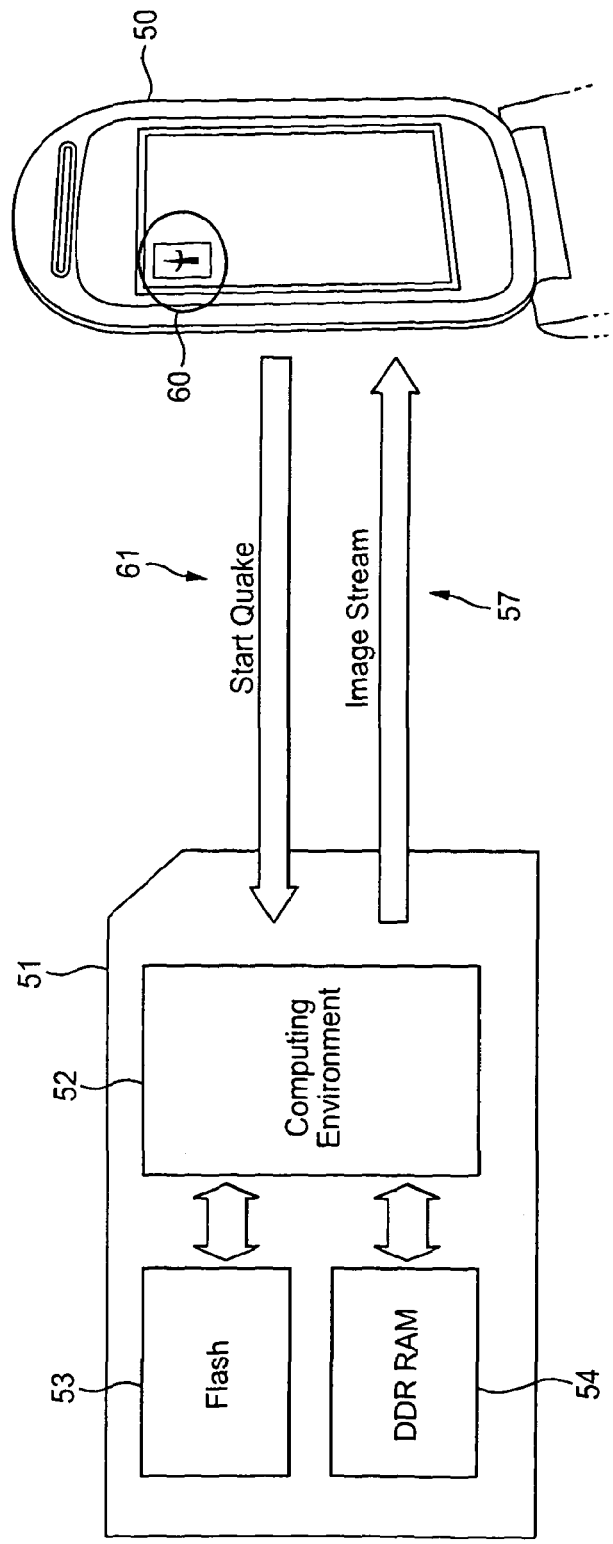
FIG. 8 shows an example of the operation of the embodiment of FIG. 1.
Figure 9:
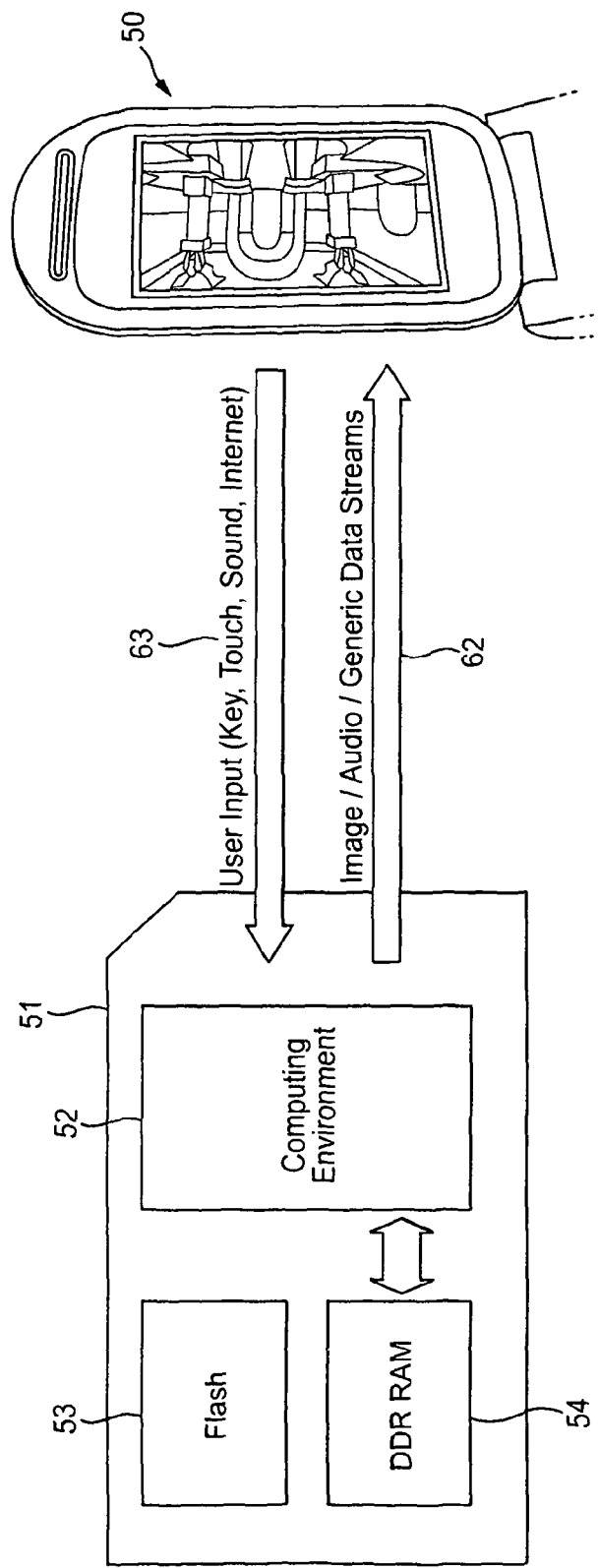
FIG. 9 shows an example of the operation of the embodiment of FIG. 1.

FIGS. 7-9 show this operation in more detail. These figures show schematically the host mobile phone 50, and the storage device 51, including the computing environment 52, the flash memory element 53 and a RAM 54.

As shown in FIG. 7, in a host device that is operable in the manner of the present embodiment, the user will be presented with a display that, for example, includes an icon 55 that the user can press to activate the operation of the client module on the host device 50.

When the user presses this icon 55 on the phone 50, the client module on the phone 50 will start, and will send an appropriate start command 56 to the server module on the storage device 51. The client module will also cause the host device to read the output, /fxiout.str, file on the storage device 51 periodically.

(For the user, the experience will be similar to starting an application in the native user interface of the phone 50.)

When the server module 52 on the storage device sees the command 56 from the host phone 50, it activates a user interface application in the computing environment 52 and returns an appropriate image stream 57 for display to the host device 50. This image stream may be sent, for example, as raw frame-buffer data, compressed frame-buffer data or a video stream.

As shown in FIG. 8, the server module continues to send the image stream 57 to the host device 50, and the client module on the host device 50 operates to display the corresponding image on the screen on the host device 50. (The image stream can be displayed in any appropriate manner on the host device 50, for example using bit blit to screen if a raw image is streamed, or by decoding the image stream and then bit blit to screen if a compressed image is streamed, or by using appropriate video decoding if the server module sends a video stream.)

In the present example, it is assumed that the image provided by the server module on the storage device 51 simply shows an icon representing the application that can be executed on the storage device 51, which in this case is shown, by way of example, as being the Quake 3 game.

The user interface image stream is continuously sent and displayed on the host device 50 until the user activates the icon 60 to start the application. In response to this user input, the client module on the host device 50 returns a start application (in this case a start "Quake") command 61 to the storage device 51. The server module on the storage device 51 will recognise that command and, for example, and in the present embodiment, cause the application (in this case Quake 3) to be loaded from the flash memory element 53 on the storage device 51 to appropriate DDR RAM 54 on the storage device 51 so that the application can then be executed by the computing environment 52 on the storage device 51.

FIG. 9 illustrates the operation once the application is running in the computing environment 52 on the storage device 51. As shown in FIG. 9, as the application is running, image, audio and other data will be generated by the application running on the storage device 51 and streamed 62 to the host device 50, with the host device 50 similarly sending relevant user inputs 63, such as key presses or touches, sound and Internet to the storage device 51 (to the server module on the storage device 51). This will continue until the user quits the application.

Although the above example is given in respect to the playing of a game, the computing environment 52 on the storage device 51 can, as discussed above, support other forms of application, such as a map application, an Internet browser application, a music player, a word processor, a spreadsheet, etc.

As will be appreciated from the above, the host device in the embodiments of the present invention simply needs to support mass storage functions to access the mass storage functions inside the storage device, and also to be capable of running the client module that interacts with the server module on the storage device. The host device may also, optionally, be able execute an application to communicate with the application processor with special function calls, but the host device still does not need to support more than ordinary mass storage functions in order to be able to do this. (This could be used, e.g., to offload computations from the host device to the application processing part of the storage device for execution. For example, computationally demanding tasks could be moved to the application processing part of the storage device by using function calls or executing program code directly on the application processing part using an appropriate communications protocol.)

Various alternatives to the above described embodiment would, of course, be possible. For example, although the present embodiment has been described with the interface processing part 7 and application processing part 6 of the computing environment 8 of the storage device 3 including a CPU, GPU and RAM, other arrangements could be used. For example, there could be one or more CPUs, one or more GPUs, various memory configurations (such as more DRAM, flash or various types of read-only memories, etc.), FPGA modules, WLAN functions, Bluetooth and other wireless functions, GPS, biometric, axial and other types of sensors, and various physical interface functions such as SD, USB, SATA, ID, PCI, PCI express, etc. In general, so long as there are microprocessors/CPUs capable of running the server, applications and interface processing on the storage device 3 and enough memory to run the server etc., the computing environment 8 can otherwise be configured as desired.

Similarly, although in the above embodiment the client module on the host device 3 acknowledges successful receipt of communication from the server module on the storage device 3 by sending an explicit acknowledgement package to the server module, in another preferred embodiment the acknowledgement mechanism uses an "implicit" acknowledgement from the client module, without requiring the client module to send an explicit acknowledgement package (thereby saving SD-bus bandwidth).

This is preferably achieved by dividing the output block address space shown in FIG. 3 into two defined output block address ranges, each associated with a respective different output file (such as /fxiout1.str and /fxiout2.str, respectively). The client is then configured to switch to reading a different output file (output address range) once it has checked and confirmed it has successfully read the current output file. The server module can then take the client module's transition to reading from another output file as being an acknowledgement that it has successfully read the previous output file.

Figure 10:
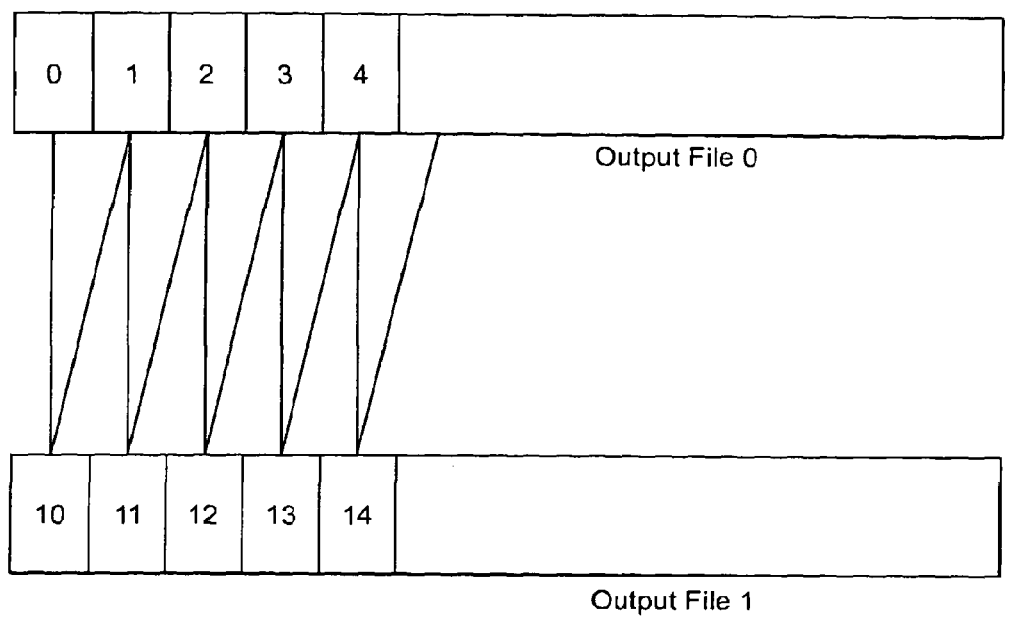
FIG. 10 shows an alternative acknowledgement mechanism.

FIG. 10 illustrates this. As shown in FIG. 10, the client module first reads block 0 from output file 0 on the storage device. Once it has successfully read the full block 0 from the output file 0, the client module then reads block 10 in output file 1. This implicitly also signals the successful read of block 0 of file 0 to the server module. Then, when the client module has successfully read block 10 from file 1, it next reads block 1 from file 0. This again signals to the server module that block 10 of file 1 has been successfully read, and so on.

In this way, the client module performs an "implicit" acknowledgement when it switches which output block addresses it reads (which it does by switching which output file it reads).

It can be seen from the above that the present invention, its preferred embodiments at least, provides an arrangement in which applications can be executed on a storage device coupled to a host electronic device, with the application processor executing the applications essentially able to operate as normal, and in particular, without a need to add any additional processing burden to the application processor.

This is achieved in the preferred embodiments of the present invention at least by providing a separate interface processor that interfaces between the communications protocol used between the host device and the storage device, and the communications protocol required by the application processor that is executing the application.

In a preferred embodiment, the interface processing part also handles mass storage functions on the mass storage device for the host device. This then enables the system to function as a mass storage device with minimal power consumption and to support a broad range of host devices.

The present invention, in its preferred embodiments at least, accordingly provides an improved host and storage device system that can, for example, be used to provide upgraded operations for a given host electronic device. By executing applications in the computing environment on the storage device, the execution of those applications is no longer dependent upon and is independent of the capabilities and performance of the host electronic device. This can, e.g., reduce the computational burden on the host electronic device, and, indeed, can allow applications to be executed for a host with limited resources (such as limited memory and computational resources). In effect therefore, the storage device can be used to provide an upgrade to the processing capabilities of the host system.

The invention claimed is:

1. A storage device operable to be coupled to a host electronic device via an interface between the storage device and the host electronic device, the storage device comprising:

at least one memory operable to store at least one application and provide mass storage functionality;

at least one processor including at least one application processing part operable to execute the at least one application on the storage device and at least one interface processing part operable to interface between a communications protocol used between the host electronic device and the storage device, and a communications protocol required or expected by an application being executed on the application processing part; and communications interfaces operable to couple the interface processing part to the host electronic device and to the application processing part of the at least one processor on the storage device, such that communication between the host electronic device and the application being executed on the application processing part takes place via the interface processing part.

2. The storage device as recited in claim 1 wherein the interface processing part of the at least one processor facilitates transparent data communication between the host electronic device and the application processing part such that the application processing part provides additional computing power to the host electronic device through the communications interfaces.

3. The storage device as recited in claim 1 wherein execution of an application on the storage device by the at least one application processing part of the at least one processor is independent of the capabilities and performance of the host electronic device.

4. The storage device as recited in claim 1 wherein the interface processing part is operable to fetch data structures that have been written to the memory by the application processing part and to process the data structures into a form suitable for transfer to the host electronic device.

5. The storage device as recited in claim 1 wherein the interface processing part is operable to process data structures received from the host electronic device into a form suitable for transfer to the application processing part and to write the data structures to the memory for use by the application processing part.

6. The storage device as recited in claim 1 wherein the interface processing part is operable to scan incoming data to identify and block any unwanted data from entering the storage device.

7. The storage device as recited in claim 1 wherein the interface processing part is operable to scan outgoing data to identify and block any unwanted data from leaving the storage device.

8. The storage device as recited in claim 1 wherein the interface processing part does not have access to the application being executed on the application processing part, thereby providing security to the storage device.

9. The storage device as recited in claim 1 wherein the interface processing part is operable to control access to and from the mass storage functionality of the storage device relative to the host electronic device.

10. The storage device as recited in claim 1 wherein the interface processing part is operable to control access to and from the mass storage functionality of the storage device relative to the application processing part.

11. The storage device as recited in claim 1 wherein the communications interfaces further comprise a mass storage communications interface between the host electronic device and the interface processing part.

12. The storage device as recited in claim 1 wherein the communications interfaces further comprise a direct interface between the application processing part and the interface processing part.

13. The storage device as recited in claim 1 wherein the communications interfaces further comprise an interrupt mechanism operable to facilitate communications between the application processing part and the interface processing part.

14. The storage device as recited in claim 1 wherein the at least one processor further comprises at least one CPU, at least one GPU and internal RAM.

15. The storage device as recited in claim 1 wherein the interface processing part and the application processing part of the at least one processor are provided on separate chips.

16. The storage device as recited in claim 1 wherein the interface processing part and the application processing part of the at least one processor are integrated in a single chip.

17. The storage device as recited in claim 1 wherein the at least one processor and the at least one memory are provided on separate chips.

18. The storage device as recited in claim 1 wherein the at least one processor and the at least one memory are integrated in a single chip.

19. A method of operating a system comprising a host electronic device and a storage device operable to be coupled to the host electronic device, the method comprising:

storing at least one application in a memory operable to provide mass storage functionality;

executing the at least one application in an application processing part of at least one processor on the storage device; and interfacing communications between the application processing part and the host electronic device using an interface processing part of the at least one processor on the storage device that is operable to interface between a communications protocol used between the host electronic device and the storage device, and a communications protocol required or expected by an application being executed on the application processing part such that communication between the host electronic device and the application that is being executed on the application processing part takes place via the interface processing part.

20. A non-transitory computer readable storage medium storing computer software code which when executing on a processor performs a method of operating a system comprising a host electronic device and a storage device operable to be coupled to the host electronic device, the method comprising:

storing at least one application in a memory operable to provide mass storage functionality;

executing the at least one application in an application processing part of at least one processor on the storage device; and interfacing communications between the application processing part and the host electronic device using an interface processing part of the at least one processor on the storage device that is operable to interface between a communications protocol used between the host electronic device and the storage device, and a communications protocol required or expected by an application being executed on the application processing part such that communication between the host electronic device and the application that is being executed on the application processing part takes place via the interface processing part.

* * * * *